United States Patent Office 3,252,983
Patented May 24, 1966

3,252,983
ARALKYL COMPOUNDS
Renat Herbert Mizzoni, Long Valley, and Robert Paul Mull, Florham Park, N.J., assignors to Ciba Corporation, New York, N.Y., a corporation of Delaware
No Drawing. Filed Aug. 28, 1964, Ser. No. 392,931
18 Claims. (Cl. 260—293)

This is a continuation-in-part application of our application Serial No. 316,534, filed October 16, 1963.

The present invention involves N-(guanidino-alkyl)-N,N-alkylene-imine compounds or salts thereof. More particularly, it relates to N-(guanidino-lower alkyl)-N,N-alkylene-imines, in which the guanidino portion is separated from the imine-nitrogen by at least two carbon atoms, and in which the alkylene imine ring system has from five to eight ring members, and one of its ring carbon atoms is substituted by the group of the formula —$(C_mH_{2m-2})R_1(R_2)(R_3)$, in which the group of the formula —$(C_mH_{2m-2})$— is lower alkylene substituted by $R_1$, $R_2$ and $R_3$, and one of the groups $R_1$, $R_2$ and $R_3$ is a monocyclic carbocyclic aryl group, whereas the other two groups are hydrogen, a monocyclic hexacyclic alicyclic group or a monocyclic carbocyclic aryl group, and salts thereof, as well as process for the preparation of such compounds.

Apart from the group of the formula

—$(C_mH_{2m-2})R_1(R_2)(R_3)$ the carbon atoms of the N,N-alkylene-imine ring system, representing above all a piperidine nucleus, as well as a pyrrolidine, a hexahydro-azepine or an octahydro-azocine nucleus, are unsubstituted or may contain other substituents, such as lower alkyl; e.g. methyl, ethyl, n-propyl and the like.

Lower alkylene representing the group of the formula —$(C_mH_{2m-2})$— may be a straight or a branched lower alkylene radical having preferably from one to four carbon atoms, above all one carbon atom.

A monocyclic carbocyclic aryl group representing $R_1$, $R_2$ and/or $R_3$ is phenyl or phenyl substituted by one or more than one of the same or of different substituents attached to any of the positions available for substitution. Suitable substituents are lower alkyl, e.g. methyl, ethyl, n-propyl, isopropyl, n-butyl and the like, hydroxyl, etherified hydroxyl, particularly lower alkoxy, e.g. methoxy, ethoxy, n-propyloxy, isopropyloxy, n-butyloxy and the like, esterified hydroxyl, particularly halogeno, e.g. fluoro, chloro, bromo and the like, halogeno-lower alkyl, e.g. trifluoromethyl, etherified mercapto, particularly lower alkyl-mercapto, e.g. methylmercapto, ethylmercapto and the like, nitro, amino, or N-substituted amino, such as N-lower alkyl-amino, e.g. N-methylamino, N-ethylamino and the like, or, more especially, N,N-di-lower alkyl-amino, e.g. N,N-dimethylamino, N,N-diethylamino and the like, or any other equivalent substituent. Two monocyclic carbocyclic aryl groups may also be directly connected and form, for example, a fluorenyl group. Preferred monocyclic carbocyclic aryl groups representing $R_1$, $R_2$ and/or $R_3$ are phenyl, (lower alkyl)-phenyl, (hydroxy)-phenyl, (lower alkoxy)-phenyl, (halogeno)-phenyl, (halogeno-lower alkyl)-phenyl, (lower alkyl-mercapto)-phenyl, (nitro)-phenyl, (amino)-phenyl, (N-lower alkyl-amino)-phenyl, (N,N-di-lower alkyl-amino)-phenyl and the like. As indicated above, at most two of the groups may also represent hydrogen, as well as a monocyclic, hexacyclic alicyclic group, which is above all cyclohexyl, but may also be (lower alkyl)-cyclohexyl, in which lower alkyl has the previously-given meaning.

The guanidino group is separated from the imine-nitrogen by at least two, preferably by two to three, carbon atoms. The lower alkyl portion linking the guanidino group with the imine-nitrogen has, therefore, at least two, preferably two to three, carbon atoms and is represented by 1,2-ethylene, 1-methyl-1,2-ethylene, 2-methyl-1,2-ethylene or 1,3-propylene, as well as 1-methyl-1,3-propylene, 2-methyl-1,3-propylene, 1,4-butylene and the like.

The guanidino group is represented by the formula

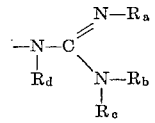

in which each of the $R_a$, $R_b$, $R_c$ and $R_d$ is hydrogen or an organic radical, preferably an aliphatic group, such as lower alkyl, particularly methyl, as well as ethyl, n-propyl, isopropyl, n-butyl, isobutyl, secondary butyl, tertiary butyl and the like, as well as an araliphatic group, such as phenyl-lower alkyl, particularly benzyl, as well as 1-phenylethyl, 2-phenylethyl and the like. The groups $R_a$ and $R_b$, when taken together, may also represent lower alkylene separating the two nitrogens by at least two, preferably by two to three, carbon atoms; such lower alkylene group is more especially 1,2-ethylene, as well as 1-methyl-1,2-ethylene, 2-methyl-1,2-ethylene, 1,3-propylene and the like. The group $R_b$ may also represent nitroso, nitro, amino or substituted amino.

Salts of the compounds of this invention are acid addition salts, for example, pharmaceutically acceptable, non-toxic acid addition salts with acids, such as pharmaceutically acceptable acids, particularly inorganic acids, e.g. hydrochloric, hydrobromic, nitric, sulfuric, phosphoric acids and the like, or organic acids, such as organic carboxylic acids, e.g. acetic, malonic, succinic, maleic, hydroxy-maleic, fumaric, malic, tartaric, citric, glucuronic, benzoic, pamoic, nicotinic, isonicotinic acid and the like, or organic sulfonic acids, e.g. methane sulfonic, ethane sulfonic, 2-hydroxyethane sulfonic, ethane 1,2-disulfonic, p-toluene sulfonic, naphthalene 2-sulfonic acid and the like. Acid addition salts may also serve as intermediates, for example, in the purification of the free compounds or for the preparation of other acid addition salts, as well as for identification and characterization purposes. Particularly useful for the latter are addition salts with certain inorganic acids, e.g. perchloric acid and the like, with acidic organic nitro compounds, e.g. picric, picrolonic, flavianic acid and the like, or with metal complex acids, e.g. phosphotungstic, phosphomolybdic, chloroplatinic, Reinecke acid and the like.

The compounds of this invention are in the form of mixtures of isomers or single isomeric compounds.

The compounds of the present invention, which may be represented by the following structural formula

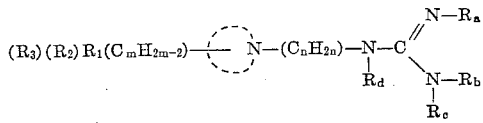

in which $R_1$, $R_2$, $R_3$, $R_a$, $R_b$, $R_c$, $R_d$ and the group of the formula —$(C_mH_{2m-2})$— have the previously-given meaning, the group of the formula

is an N,N-alkylene-imino group having from five to eight ring members, in which one of its carbon atoms is substituted by the group of the formula

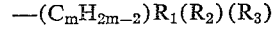

and the group of the formula —$(C_nH_{2n})$— is lower alkylene separating the guanidino grouping from the imino-nitrogen by at least two carbon atoms, or the salts thereof, cause a marked decrease of the gastric secretion of hydrochloric acid. This pharmacological effect is demonstrated with a test using the Pavlov pouch dog, in which gastric secretion is stimulated by the intake of food, and is measured via a fistula into the stomach pouch, as well as with a test using dogs, in which gastric secretion is induced by histamine, and is measured via a fistula into the stomach. In both of these tests, the compounds of the present invention, which are orally active, cause a decrease of the gastric secretion. The compounds of this invention are, therefore, useful in the management and treatment of gastric irritation or gastric ulcers by reducing the amount of free hydrochloric acid in the stomach. They are also useful as research tools in the study of the mechanism of gastric secretion of hydrochloric acid.

Compounds of this invention also have antihypertensive effects and are, therefore, useful as antihypertensive agents.

Particularly useful are 1-(guanidino-lower alkyl)-piperidines, in which one of the ring carbon atoms of the piperidine nucleus is substituted by a diphenylmethyl group, and in which the guanidino portion is separated from the ring nitrogen atom by two to three carbon atoms, or acid addition salts thereof. These compounds are represented by the following formula

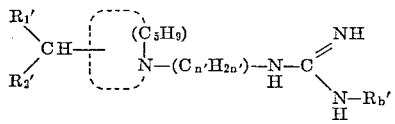

in which each of the groups $R_1'$ and $R_2'$ is phenyl, (lower alkyl)-phenyl, (lower alkoxy)-phenyl, (halogeno)-phenyl, (trifluoromethyl)-phenyl or (N,N-di-lower alkylamino)-phenyl, the group of the formula —$(C_5H_9)$— is a 1,5-pentylene radical substituted by the group of the formula

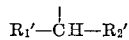

the group of the formula —$(C_{n'}H_{2n'})$— is alkylene having from two to three carbon atoms and separating the guanidino group from the ring nitrogen by two to three carbon atoms, and the group $R_b'$ is hydrogen or lower alkyl, or acid addition salts thereof.

Preferred compounds are the 1-guanidino-lower alkyl-piperidines, in which the 3-position is substituted by the group of the formula

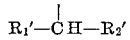

$R_1'$ and $R_2'$ having the previously-given meaning, and in which lower alkyl separates the guanidino group from the ring nitrogen by two to three carbon atoms, or acid addition salts thereof; these compounds are represented by the formula

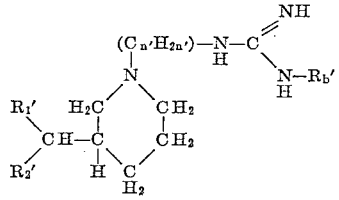

in which $R_1'$, $R_2'$, $R_b'$ and the group of the formula —$(C_{n'}H_{2n'})$— have the previously-given meaning, or acid addition salts thereof.

The compounds of this invention are useful in the form of compositions suitable for enteral or parenteral use, comprising essentially a pharmacologically effective amount of one of the new guanidine compounds of this invention, preferably in the form of their pharmaceutically acceptable acid addition salts, in admixture with a pharmaceutically acceptable, organic or inorganic, solid or liquid carrier. A dosage unit form comprises from about 10 percent to about 75 percent of the pharmacologically active component. These preparations are in solid form, for example, as capsules, tablets, dragées and the like, or in liquid form, for example, as solutions, suspensions, emulsions and the like. Suitable carrier materials are, for example, starches, e.g. corn starch, wheat starch, rice starch and the like, sugars, e.g. lactose, glucose, sucrose and the like, stearic acid or salts thereof, e.g. magnesium stearate, calcium stearate and the like, stearyl alcohol, talc, gums, acacia, tragacanth, polyalkylene glycols, propylene glycol, water and the like. The quantity and the nature of the carrier ingredients may vary widely and depends inter alia upon the desired physical appearance of size of the compositions, methods of manufacture and the like. Encapsulation may be effected using, if desired, the same excipients as those used for tablets. If necessary, the compositions having as the effective pharmacological ingredient one of the compounds of this invention, may contain other auxiliary substances, such as preserving, stabilizing, wetting, emulsifying agents and the like, salts for varying the osmotic pressure, buffers, etc. They may also contain, in combination, other useful substances. The compounding of the formulations is carried out in the manner normally employed in the art, i.e. by manufacturing a mixture, a granulate and the like. Any compatible color, approved and certified under the provisions of the Federal Food, Drug and Cosmetic Law may be used for aesthetic purposes or as a means of identification.

The new compounds of this invention are prepared according to known methods, for example, by converting in an N-(amino-lower alkyl)-N,N-alkylene-imine, and in which amino, separated from the imino-nitrogen by at least two carbon atoms, has at least one hydrogen atom or instead a substituent capable of being converted into an amidino group, and in which the N,N-alkylene-imine ring system has from five to eight ring members, and one of its ring carbon atoms is substituted by the group of the formula —$(C_mH_{2m-2})R_1(R_2)(R_3)$, in which $R_1$, $R_2$, $R_3$ and the group of the formula —$(C_mH_{2m-2})$— have the previously-given meaning, or a salt thereof, the amino group into a guanidino group, and, if desired, converting a resulting salt into the free compound or into another salt, and/or, if desired, converting a free compound into a salt thereof, and/or, if desired, separating a resulting mixture of isomers into the single isomers.

The preferred starting materials used in the above reaction are those, in which the amino group has at least one hydrogen atom, and is represented, for example, by the group of the formula —NH—$R_d$, in which $R_d$ has the previously-given meaning. The reagents of choice for the conversion of such amino group into a guanidino group are primarily S-lower alkyl-isothioureas, as well as O-lower alkyl-isoureas, particularly those of the formula

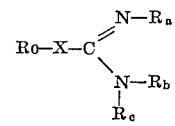

in which $R_a$, $R_b$ and $R_c$ have the previously-given meaning, $R_o$ stands for lower alkyl, particularly methyl, as well as ethyl, n-propyl, isopropyl and the like, and X is primarily sulfur, as well as oxygen, or acid addition salts thereof. The latter, which are employed in preference over the free compound, are especially addition salts with mineral acids, such as hydrochloric, hydrobromic, sulfuric acid and the like. The preferred reagents are the mineral acid addition salts, e.g. the hydrochlorides, the sulfates and the like, of S-methyl-isothioureas. The starting materials are preferably used in the form of the free compounds.

The above reaction is carried out by contacting the starting material with the reagent, preferably in the presence of a diluent, the choice of which depends primarily on the solubility of the reactants. Water or water-miscible organic solvents, such as lower alkanols, e.g. methanols, ethanol, propanol, isopropanol, tertiary butanol and the like, ethers, e.g. diethyleneglycol dimethylether, p-dioxane, tetrahydrofuran and the like, ketones, e.g. acetone, ethyl methyl ketone and the like, lower alkanoic acids, e.g. acetic acid and the like, formamide, e.g. formamide, N,N-dimethylformamide and the like, or aqueous mixtures of such solvents are preferred diluents. The reaction may be carried out at room temperature or, preferably, at an elevated temperature, for example, on the steam bath or at the boiling temperature of the solvent, and, if necessary, in the atmosphere of an inert gas, e.g. nitrogen.

Another reagent capable of transforming an amino group having at least one hydrogen atom into the desired guanidino group, is a cyanamide compound, especially a compound of the formula $$N\equiv C-N-R_b$$
$$\phantom{N\equiv C-N-}R_c$$

in which $R_b$ and $R_c$ have the previously-given meaning. For example, a mixture of the cyanamide reagent with the amine starting material, which is preferably used in the form of a salt thereof, particularly a mineral acid addition salt, e.g. the hydrochloride, hydrobromide, sulfate and the like, thereof, may be heated to form a melt, which is then dissolved in a solvent, such as a lower alkanoic acid, e.g. acetic acid and the like, and the desired product is isolated. The reaction may also be performed in the presence of a suitable solvent, such as a lower alkanol, e.g. ethanol and the like. The salts used as the starting material may also be formed in situ by carrying out the reaction in the presence of an acid, particularly of a concentrated aqueous mineral acid, e.g. hydrochloric acid and the like. The cyanamide reagent too may be formed in situ; for example, 1-nitroso-3-methyl-guanidine furnishes the N-methyl-cyanamide during the reaction, and the latter then reacts with the amine starting material to form the desired guanidine compound. The reaction may proceed exothermically, and, if necessary, may be maintained by heating, for example, to from about 80° to about 200°; the atmosphere of an inert gas, e.g. nitrogen, may be advantageous.

A third modification of the general procedure for the manufacture of the compounds of this invention from the above amine starting materials, in which the amino group carries at least one hydrogen atom, comprises reacting such starting material with a salt of a 1-guanyl-pyrazole. A salt of a 1-guanyl-pyrazole is primarily a salt with a mineral acid, such as, for example, nitric acid; the pyrazole nucleus of such reagent may contain additional substituents, particularly lower alkyl, e.g. methyl, ethyl and the like. 1-guanyl-3,5-dimethyl-pyrazole salts, particularly the nitrate thereof, represent the preferred reagents. The reaction may be carried out in the absence of a solvent, for example, by fusing the two reactants, or in the presence of a diluent, such as, for example, a lower alkanol, e.g. ethanol and the like; advantageously, contact with carbon dioxide should be avoided, for example, by performing the reaction in the atmosphere of an inert gas, e.g. nitrogen. The reaction mixture is preferably heated, for example, to the melting point of the mixture or to the boiling point of the solvent.

Other N-(amino-lower alkyl)-N,N-alkylene-imine starting materials useful in the above procedure for the preparation of the compounds of this invention, are N-(amino-lower alkyl)-N,N-alkylene-imines, in which amino is separated from the imino-nitrogen by at least two carbon atoms, and is substituted by a substituent capable of being converted into an amidino group, and in which the N,N-alkylene-imine ring system has from five to eight ring members, and one of its ring carbon atoms is substituted by the group of the formula $-(C_mH_{2m-2})R_1(R_2)(R_3)$, in which $R_1$, $R_2$, $R_3$ and the group of the formula $-(C_mH_{2m-2})-$ have the previously-given meaning, or salts thereof. Such starting materials are represented by the compounds of the formula

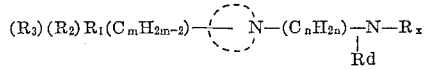

in which $R_1$, $R_2$, $R_3$, $R_d$ and the groups of the formulae

$-(C_mH_{2m-2})$, and $-(C_nH_{2n})-$ have the previously-given meaning, and $R_x$ is a group capable of being converted into an amidino group of the formula

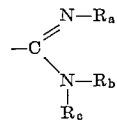

in which $R_a$, $R_b$ and $R_c$ have the previously-given meaning, or a salt thereof.

For example, the substituent capable of being converted into an amidino group, i.e. the group $R_x$ in the above formula, may be formed by a carbon atom attached to the nitrogen of the amino group, and to such carbon atom there is connected another nitrogen in addition, the carbon atom may carry a further nitrogen or substituted nitrogen, or other heteroatoms, such as, for example, oxygen or sulfur, as well as substituted heteroatoms. The above substituent, represented by $R_x$, is, for example, cyano of the formula $-C\equiv N$, carbamyl, represented by the formula $-CONH-R_a$, in which $R_a$ has the above-given meaning, thiocarbamyl, having, for example, the formula $-CSNH-R_a$, lower alkoxy-(imino) methyl, having especially the formula $-C(=N-R_a)-OR_o$, in which $R_o$ has the previously-given meaning, i.e. represents lower alkyl, primarily methyl, as well as ethyl and the like, lower alkyl-mercapto-(imino) methyl, as represented by the formula $-C(=N-R_a)-SR_o$, cyano-amidino, having the formula $-C(=N-R_a)-N(R_b)-C\equiv N$, in which $R_b$ has the previously-given meaning, guanidino-(imino)methyl, having especially the formula $$-C(=N-R_a)-[-N(R_b)-C(=NH)-NH_2]$$

isocyano-(imino)methyl represented by the formula $-C(=N-R_a)-N=C=O$, or isothiocyano-(imino) methyl having preferably the formula $$-C(=N-R_a)-N=C=S$$

and the like. Amine starting materials having such groups attached to the amino nitrogen atom, fit the above structural requirements, i.e. to the amino group is attached a carbon atom, which carries at least one nitrogen atom, apart from any other nitrogen or hetero atoms. Starting materials having such substituents are converted into the desired guanidino derivatives according to known methods, usually by ammonolysis or aminolysis. Certain starting materials, such as those in which the substituent representing the group $R_x$ is an isocyano-(imino) methyl or an isothiocyano-(imino)methyl group, are converted into the desired guanidino compounds by hydrolysis.

Apart from amine starting materials, in which a carbon atom with a nitrogen represents the substituent of the amino-nitrogen, i.e. group $R_x$, other amine starting materials, in which the substituent of the amino group is convertible into an amidino group, may be used for the manufacture of the compounds of this invention. In the conversion of such starting materials, intermediate compounds may be formed, which may have the previously-given characteristics, i.e. the carbon atom of the substituent, i.e. group $R_x$, carries a nitrogen atom. Suitable substituents of that type representing $R_x$ are, for example, ester groups, such as those of a carboxyl or a thionocarboxyl group with a lower alkanol or a lower alkyl-mercaptan, as well as halogen-carbonyl or halogeno-thionocarbonyl groups, in which halogeno represents primarily chloro.

Due to the diverse nature of the substituent representing $R_x$, its conversion into an amidino group is carried out according to different and well-known process modifications, either directly or in stages, and, if necessary, in the presence of reaction promoting agents, dehydrating or desulfurizing reagents and the like, while cooling or at an elevated temperature, in a closed vessel, and/or in the atmosphere of an inert gas, e.g. nitrogen.

The N-(amino-lower alkyl)-N,N-alkylene-imine starting materials used in the above procedure of this invention are new and are intended to be included within the scope of the invention. They are represented by the following formula

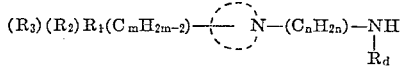

in which $R_1$, $R_2$, $R_3$, $R_d$ and the groups of the formulae

—$(C_mH_{2m-2})$— and —$(C_nH_{2n})$— have the previously-given meaning, or the salts thereof. The preferred starting materials are those of the formula

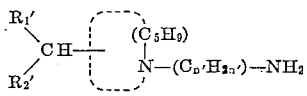

in which $R_1'$, $R_2'$ and the groups of the formulae —$(C_5H_9)$— and —$(C_{n'}H_{2n'})$— have the previously-given meaning, or the acid addition salts thereof; these starting materials are represented by the compounds of the formula

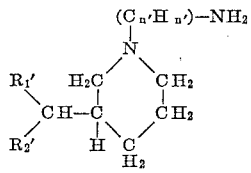

in which $R_1'$, $R_2'$ and the group of the formula —$(C_{n'}H_{2n'})$— have the previously-given meaning, or the acid addition salts thereof.

The above starting materials are prepared according to known methods. For example, an N,N-alkylene-imine, in which the alkylene-imine ring system has from five to eight ring members, and one of its carbon atoms is substituted by the group of the formula

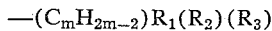

—$(C_mH_{2m-2})R_1(R_2)(R_3)$ in which $R_1$, $R_2$, $R_3$ and the group of the formula —$(C_mH_{2m-2})$— have the previously-given meaning, or a salt, such as an alkali metal salt, thereof, may be treated with a halogeno-lower alkyl-nitrile, in which halogeno is, for example, chloro, bromo and the like (preferably in the presence of an additional base, e.g. sodium carbonate and the like), or with a lower alkeno-nitrile, in which the double bond is activated by the nitrile group, so that it adds to the imine-nitrogen (which reaction is carried out in the presence of a suitable base, e.g. benzyl trimethyl ammonium hydroxide and the like), and converting in a resulting N-(cyano-lower alkyl)-N,N-alkylene-imine compound cyano into amino-methyl by reduction. The latter may be carried out, for example by catalytic hydrogenation, such as, treatment with hydrogen in the presence of a catalyst containing a metal of the eighth group of the Periodic System, e.g. palladium on charcoal, Raney nickel and the like, or by treatment with a light metal hydride, for example, an aluminum hydride, e.g. lithium aluminum hydride, sodium aluminum hydride, magnesium aluminum hydride, aluminum borohydride, aluminum hyride and the like, which reagents may be used, if desired, in the presence of an activator, such as aluminum chloride and the like.

The N-(amino-lower alkyl)-N,N-alkylene-imine starting material may also be obtained by reacting an N,N-alkylene-imine, in which the alkylene-imine ring system has from five to eight ring members and one of its carbon atoms is substituted by the group of the formula —$(C_mH_{2m-2})R_1(R_2)(R_3)$ in which $R_1$, $R_2$, $R_3$ and the group of the formula —$(C_mH_{2m-2})$— have the previously-given meaning, with an N-(halogeno-lower alkyl)-phthalimide, in which halogeno is separated from the nitrogen by at least two carbon atoms, in the presence of a suitable base, e.g. potassium carbonate, and cleaving the resulting N-(N,N-alkylene-imino-lower alkyl)-phthalimide by treatment with hydrazine to yield the desired starting material; the above reaction is carried out according to the Gabriel synthesis.

The N,N-alkylene-imine intermediates, in which the alkylene-imine ring system has from five to eight ring members, and one of its carbon atoms is substituted by the group of the formula 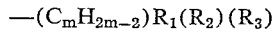—$(C_mH_{2m-2})R_1(R_2)(R_3)$, in which $R_1$, $R_2$, $R_3$ and the group of the formula —$(C_mH_{2m-2})$— have the previously-given meaning, are known or are prepared according to known methods. In the case of intermediates in which the N,N-alkylene-imine portion represents a piperidine nucleus, the corresponding pyridine analogs are usually prepared, which are then reduced to yield the desired piperidine compounds. Thus, pyridine intermediates, in which the group of the formula —$(C_mH_{2m-2})R_1(R_2)(R_3)$ represents a preferred diphenylmethyl group (i.e. $m$ is 1, $R_1$ and $R_2$ each represent monocyclic carbocyclic aryl, and $R_3$ is hydrogen), are obtained, for example, by reacting an organo-metallic pyridine reagent, such as pyridyl lithium, a pyridyl magnesium halide and the like, with a benzophenone, or by reacting an ester of a pyridine carboxylic acid with a phenyl-organo-metallic compound, especially a phenyl magnesium halide and the like, and, if necessary and/or desired, subsequently removing in a resulting [diphenyl-(hydroxy)-methyl]-pyridine compound, the hydroxyl group by reduction, for example, with catalytically activated hydrogen. They may also be obtained by treating a pyridine carboxaldehyde with a benzene compound in the presence of a strong acid, e.g. sulfuric acid and the like, by reacting a diphenylacetonitrile with a halogeno-pyridine in the presence of a base, and subsequently replacing in a resulting [diphenyl-(cyano)-methyl]-pyridine compound, the cyano group by hydrogen, for example, by acid hydrolysis and decarboxylation, or any other suitable method.

As indicated above, the thus obtained pyridine intermediates or salts thereof are then converted into the corresponding piperidine analogs by reduction, for example, by the treatment with catalytically activated hydrogen, employed at atmospheric, as well as under increased pressure, using catalysts containing elements of the VIII group (Transition $b$ group) of the Periodic System, particularly palladium, or platinum, as well as nickel and the like, such as platinum oxide, palladium-on-charcoal and the like, as well as Raney nickel and the like. The hydrogenation reaction is performed in the presence of a solvent, e.g. acetic acid, ethanol and the like, or solvent mixture, and, if necessary, of an acid, e.g. acetic, hydrochloric acid and the like, at an elevated temperature, and/or under increased pressure. In the pyridine intermediates, a group capable of being replaced by hydrogen, e.g. hydroxyl, as well as reactive esterified hydroxyl, especially halogeno, e.g. chloro, bromo and the like, may substitute the methyl portion of a diphenylmethyl group; usually, it is replaced by hydrogen under the conditions of the reduction.

Other intermediates, for example, piperidine compounds, in which $R_1$ alone, or all three groups $R_1$, $R_2$ and $R_3$, of the group of the formula —$(C_mH_{2m-2})R_1(R_2)(R_3)$ are monocyclic carbocyclic aryl, or the letter m in the group of the formula —$(C_mH_{2m-2})$— is greater than 1, as well as compounds, in which the N,N-alkylene-imine portion is a nucleus other than a piperidine ring, are prepared according to known methods, such as those illustrated below. Furthermore, a monocyclic carbocyclic aryl group may be converted into a monocyclic hexacyclic alicyclic group by reduction, for example, with catalytically activated hydrogen at an elevated temperature and under increased pressure. In addition, N-(amino-lower alkyl)-N,N-alkylene-imine starting materials, in which amino is substituted by a group capable of being converted into an amidino group, are prepared according to known methods, usually employing the previously-described amine starting materials as the appropriate intermediates.

The compounds of this invention may also be prepared by converting in an N-(guanidino-lower alkanoyl)-N,N-alkylene-imine, an N-(guanidino-lower thioalkanoyl)-N,N-alkylene-imine, an N-(N,N-alkylene-imino)-lower alkanoic acid guanide or an N-(N,N-alkylene-imino)-lower thioalkanoic acid guanide, in which the guanidino portion is separated from the imine-nitrogen by at least two carbon atoms, and in which the N-alkylene-imine ring has from five to eight ring members and one of its ring carbon atoms is substituted by the group of the formula —$(C_mH_{2m-2})R_1(R_2)(R_3)$, in which $R_1$, $R_2$, $R_3$ and the group of the formula —$(C_mH_{2m-2})$— have the previously-given meaning, the carbonyl or the thiocarbonyl group into methylene, and, if desired, carrying out the optional steps.

The above starting materials are represented by the formulae

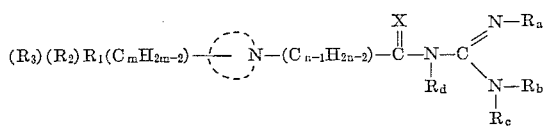

or

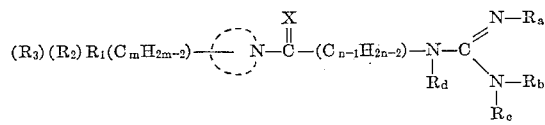

in which $R_1$, $R_2$, $R_3$, $R_a$, $R_b$, $R_c$, $R_d$ and the groups of the formulae

and —$(C_mH_{2m-2})$— have the previously-given meaning, the group of the formula —$(C_{n-1}H_{2n-2})$— is lower alkylene, and the group X is oxygen or sulfur.

Conversion of carbonyl into methylene is carried out according to known methods, for example, by treatment with an aluminum hydride, particularly an alkali metal aluminum hydride, e.g. lithium aluminum hydride, sodium aluminum hydride and the like, or an alkaline earth metal aluminum hydride, e.g. magnesium aluminum hydride and the like, or aluminum hydride, in the presence of a suitable inert solvent and, if necessary, at an elevated temperature, and/or in the presence of an activating reagent, e.g. aluminum chloride and the like. The above conversion may also be achieved by treatment with catalytically activated hydrogen using, for example, a copper-chromium catalyst, by electrolytic reduction and the like.

Replacement of sulfur in a thiocarbonyl group by two hydrogens is carried out by desulfurization according to known methods, for example, by treatment with a freshly prepared hydrogenation catalyst, such as Raney nickel, in an alcoholic solvent, e.g. methanol, ethanol and the like, if desired, in the presence of hydrogen, or by electrolytic reduction and the like.

The above starting materials are prepared according to known procedures used for the preparation of amide-type compounds; the carbonyl group in a resulting amide type compound is converted into a thiocarbonyl group by treatment with a suitable reagent, e.g. phosphorus pentasulfide and the like.

A resulting salt is converted into the free compound in the customary way, for example, by treatment with a strong alkaline reagent, such as a metal hydroxide, e.g. lithium hydroxide, sodium hydroxide, potassium hydroxide and the like, a strong quaternary ammonium amino (hydroxyl ion) exchange preparation and the like.

A resulting salt is converted into another salt according to known methods, for example, by treatment with a suitable anion exchange preparation. On the other hand, a resulting salt with an inorganic acid may be converted into another salt by treatment with a salt, e.g. sodium, barium, silver and the like, salt of an acid in the presence of a diluent, in which a resulting inorganic compound is insoluble and is thus removed from the reaction medium. Furthermore, a "half-sulfate" may be converted into a "mono-sulfate" by treatment with sulfuric acid.

A free compound is transformed into an acid addition salt by reacting it, preferably a solution thereof in the presence of a solvent or solvent mixture, with the appropriate inorganic or organic acid or a solution thereof, or with an anion exchange preparation, and isolating the salt. Semi-, mono- or poly-salts may be formed, as well as mixed salts, and the salts may be isolated in the form of their hydrates or may contain solvent of crystallization.

The invention also comprises any modification of the general process, wherein a compound obtainable as an intermediate at any stage of the process is used as the starting material and the remaining step(s) of the process is(are) carried out; also included within the scope of the invention are any new intermediates.

In the process of this invention such starting materials are preferably used which lead to final products mentioned in the beginning as preferred embodiments of the invention.

The following examples illustrate the invention and are not to be construed as being limitations thereon. Temperatures are given in degrees centigrade.

*Example 1*

A mixture of 4.2 g. of 1-(2-aminoethyl)-3-benzhydryl-piperidine and 1.9 g. of S-methyl-isothiourea sulfate in 25 ml. of a 1:1-mixture of ethanol and water is refluxed for three hours and is then allowed to stand overnight at room temperature. The solvent is evaporated under reduced pressure; the residue is taken up in anhydrous ethanol and the solvent is again evaporated. After repeating the latter procedure several times, and then triturating the residue with diethyl ether, the 3-benzhydryl-1-(2-guanidinoethyl)-piperidine sulfate of the formula

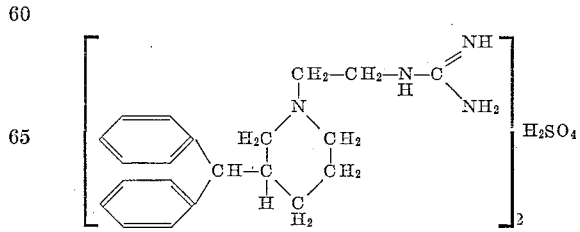

crystallizes and is recrystallized from a mixture of ethanol and diethyl ether, M.P. 155° (with decomposition); yield: 4.0 g. It analyzes as follows. Calcd. for $C_{42}H_{48}N_8O_4S$ (M.W. 771.00): C, 63.21; H, 7.70; N, 14.04. Found: C, 63.07; H, 7.65; N, 13.81.

The starting material used in the above procedure is prepared as follows: A mixture of 35.0 g. of 3-benzhydryl-piperidine, 11.8 g. of chloroacetonitrile and 42 g. of sodium carbonate in 150 ml. of toluene and 3.5 g. of water is refluxed for twenty hours while stirring. The hot solution is filtered, the residue is washed with hot benzene, and the combined filtrates are evaporated under reduced pressure. The residual oil is triturated with diethyl ether and yields the crystalline 3-benzhydryl-1-cyanomethyl-piperidine, M.P. 120–122° (with decomposition).

A solution of 16.0 g. of 3-benzhydryl-1-cyanomethyl-piperidine in 100 ml. of tetrahydrofuran is added over a period of thirty minutes to a solution of 4.5 g. of lithium aluminum hydride in 100 ml. of tetrahydrofuran while stirring. After agitating for an additional three hours at room temperature, the reaction mixture is allowed to stand overnight, and is then cooled in an ice-bath and decomposed by adding in the following order 13.5 ml. of ethyl acetate, 4.5 ml. of water, 9.0 ml. of a 15 percent aqueous solution of sodium hydroxide and 13.5 ml. of water. After stirring for thirty minutes, the reaction mixture is filtered, the solid material is washed with tetrahydrofuran, and the combined filtrates are evaporated under reduced pressure. The desired 1-(2-aminoethyl)-3-benzhydryl-piperidine of the formula

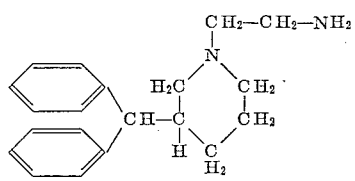

is distilled and collected at 162–166°/0.15 mm.; yield: 12.7 g. Its dihydrochloride melts at 139–140° (with decomposition) after recrystallization from isopropanol.

*Example 2*

A solution of 12.7 g. of 1-(2-aminoethyl)-3-benzhydryl-piperidine and 5.4 g. of S-methyl-isothiourea hydrochloride in 30 ml. of anhydrous ethanol is refluxed for three hours, and is then allowed to stand overnight at room temperature. The solvent is evaporated under reduced pressure; the residue is treated with acetone and the solvent is again evaporated. The gummy residue is dissolved in isopropanol, the solution is diluted with diethyl ether, and the liquid phase is decanted from the resulting product, which is triturated with diethyl ether until crystallization occurs. The desired 3-benzhydryl-1-(2-guanidino-ethyl)-piperidine hydrochloride of the formula

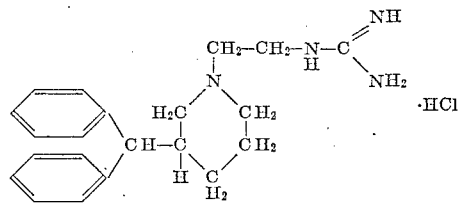

is dried under reduced pressure to yield the hemihydrate, M.P. 128° (with decomposition); yield: 14.0 g. It analyzes as follows.

Calcd. for $C_{21}H_{29}N_4Cl \cdot \frac{1}{2}H_2O$: C, 66.03; H, 7.92; N, 14.67. Found: C, 65.99; H, 7.86; N, 14.96.

*Example 3*

A solution of 2.6 g. of N,N′,S-trimethyl-isothiourea hydrochloride and 5.0 g. of 1-(2-aminoethyl)-4-benzhydryl-piperidine in 15 ml. of ethanol is refluxed for three hours. The solvent is removed under reduced pressure, and the residue crystallizes on adding acetone and chilling. After recrystallizing it from isopropanol, the 4-benz-hydryl-1-[2-(2,3-dimethyl-guanidino)-ethyl] - piperidine hydrochloride of the formula

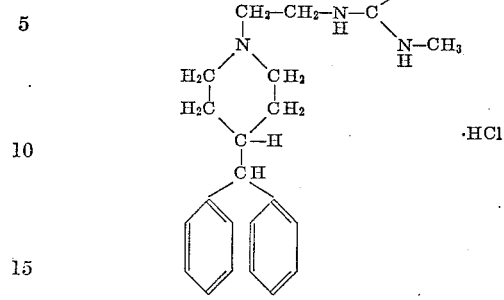

melts at 132–133° (with decomposition) and contains a mole of ethanol of crystallization which cannot be eliminated by repeated recrystallizations. It analyzes as follows.

Calcd. for $C_{23}H_{33}N_4Cl \cdot C_2H_5OH$: C, 67.16; H, 8.79; N, 12.53. Found: C, 66.91; H, 8.88; N, 12.52.

The starting material used in the above procedure is prepared as follows: A solution of 25.1 g. of 4-benzhydryl-piperidine and 8.3 g. of chloroacetonitrile in 200 ml. of toluene and 2.0 ml. of water is stirred at reflux temperature for twelve hours in the presence of 31.8 g. of sodium carbonate. The reaction mixture is worked up as described in Example 1 to yield the 4-benzhydryl-1-cyanomethyl-piperidine, M.P. 145–146°; yield: 24.5 g.

To a solution of 7.8 g. of lithium aluminum hydride in 145 ml. of tetrahydrofuran is added over a period of two hours, 24.5 g. of 4-benzhydryl-1-cyanomethyl-piperidine in 245 ml. of tetrahydrofuran. After stirring for fifty hours at room temperature, the reaction mixture is decomposed by adding 23.4 ml. of ethyl acetate, 7.8 ml. of water, 15.6 ml. of a 15 percent aqueous solution of sodium hydroxide and 23.4 ml. of water. Stirring is continued for thirty minutes; the solid material is filtered off and washed with tetrahydrofuran, and the combined filtrates are evaporated. The desired 1-(2-aminomethyl)-4-benzhydryl-piperidine of the formula

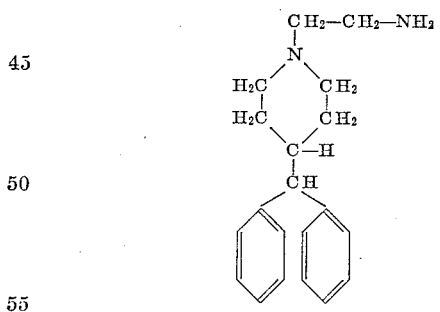

is purified by distillation and collected at 165–168°/0.025 mm.; yield: 16.9 g. Its dihydrochloride melts at 270–273° after recrystallization from ethanol.

The N,N′,S-trimethyl-isothiourea hydrochloride reagent used in the above procedure is prepared as follows: A solution of 4.92 g. of N,N′,S-trimethyl-isothiourea hydriodide in 40 ml. of methanol containing 5.5 g. of hydrogen chloride, is evaporated in an open vessel while heating on a steam bath. The residue is treated with diethyl ether, and the resulting N,N′,S-trimethyl-isothiourea hydrochloride is recrystallized from a mixture of ethanol and diethyl ether, M.P. 177–179°; yield: 2.4 g.

*Example 4*

A mixture of 5.0 g. of 1-(2-aminoethyl)-4-benzhydryl-piperidine and 2.1 g. of S-methyl-isothiourea hydrochloride in 15 ml. of anhydrous ethanol is refluxed for three hours. The solvent is evaporated under reduced pressure; the residual oil is dissolved in acetone and the solvent is again evaporated. The residue is taken up into ethyl methyl ketone; the solution is treated with a charcoal preparation and is filtered into an excess of diethyl ether. A gummy material separates, which is redissolved in ethanol and treated with hydrogen chloride in ethanol. A gummy material precipitates upon adding diethyl ether and is redissolved in isopropanol. The solution is treated with a charcoal preparation, and filtered into diethyl ether, whereupon the crystalline 4-benzhydryl-1-(2-guanidino-ethyl)-piperidine dihydrochloride of the formula

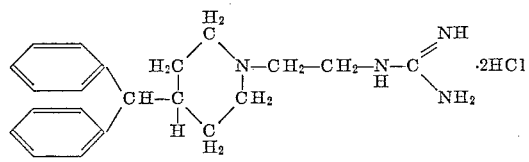

is obtained as the hemihydrate, which melts at 163–166° (with decomposition); yield: 4.5 g. It analyzes as follows.

Calcd. for $C_{21}H_{28}N_4 \cdot 2HCl \cdot \frac{1}{2}H_2O$: C, 60.30; H, 7.48; N, 13.40. Found: C, 59.82; H, 7.94; N, 13.74.

*Example 5*

A solution of 3.4 g. of N-isopropyl-S-methyl-isothiourea hydrochloride and 5.9 g. of 1-(2-aminoethyl)-3-benzhydryl-piperidine in 25 ml. of anhydrous ethanol is refluxed for 4½ hours. The solvent is removed under reduced pressure; upon adding ethanol, an oily material separates, which is triturated three times with diethyl ether and is then dissolved with ethyl methyl ketone. The desired 3-benzhydryl-1-[2-(3-isopropyl-guanidino)-ethyl]-piperidine hydrochloride of the formula

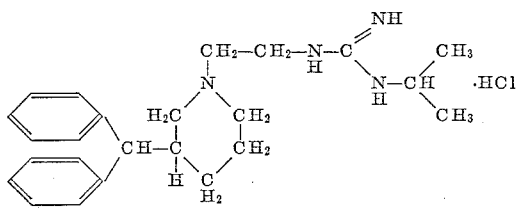

is precipitated by adding diethyl ether and recrystallized from ethyl methyl ketone, M.P. 182.5–183°.

The N-isopropyl-S-methyl-isothiourea hydrochloride used in the above procedure is prepared as follows: A solution of 113.7 g. of N-isopropyl-2-thiourea (prepared from isopropyl-isothiocyanate and ammonium hydroxide according to the general procedure described by Moore et al., Organic Syntheses, coll. vol. 3, p. 61 (1955)), and 66 ml. of methyl iodide in 300 ml. of ethanol is refluxed for one hour on the steam bath. The solvent is removed under reduced pressure, and the oily residue is taken up in 250 ml. of methanol. The solution is treated with gaseous hydrogen chloride while refluxing and is evaporated on the steam bath. The residue is dissolved in acetone and after scratching, a crystalline material is formed; the mixture is diluted with ethyl acetate and the supernatant liquid is decanted. The desired N-isopropyl-S-methyl-isothiourea hydrochloride is obtained by trituration with ethyl acetate and acetone, and drying, M.P. 152–152.5°; yield: 39 g.

*Example 6*

A solution of 3.1 g. of N,N,S-trimethyl-isothiourea hydrochloride and 5.9 g. of 1-(2-aminoethyl)-3-benzhydryl-piperidine in 25 ml. of anhydrous ethanol is refluxed for four hours and concentrated to about half of the original volume. After adding diethyl ether, a gummy precipitate is formed, which crystallizes upon repeated trituration with diethyl ether to yield the 3-benzhydryl-2-[2-(3,3-dimethyl-guanidino)-ethyl]-piperidine hydrochloride of the formula

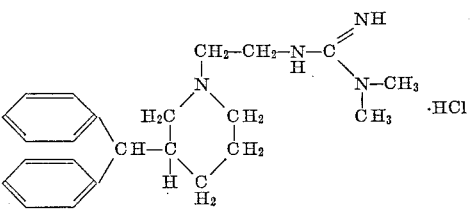

which melts at 233–235° (with decomposition) after recrystallization from a 1:2-mixture of isopropanol and ethyl acetate.

The N,N,S-trimethyl-isothiourea hydrochloride used as the reagent in the above procedure is prepared as follows: A solution of 35.0 g. of N,N-dimethyl-cyanamide in 70 ml. of pyridine and 69.3 ml. of N,N,N-triethylamine is heated to 60° and gassed during 3½ hours with hydrogen sulfide. The reaction mixture is stirred and then allowed to stand during two days, whereupon a solid material is formed which is filtered off, partially air-dried, washed with isopropanol and air-dried. The resulting N,N-dimethyl-2-thiourea is recrystallized twice from water, washed with ethanol and dried at 45° under reduced pressure; yield: 17.7 g.

A mixture of 17.7 g. of N,N-dimethyl-2-thiourea and 7.3 ml. of methyl iodide in 125 ml. of anhydrous ethanol is refluxed for 2½ hours. On removal of the solvent, a partially crystalline product is obtained, which solidifies on treatment with ethyl acetate. The resulting N,N,S-trimethyl-isothiourea hydriodide is recrystallized from isopropanol, M.P. 99–100°, and is dissolved in 100 ml. of methanol. While refluxing, the solution is treated with gaseous hydrogen chloride, and then evaporated on the steam bath. The resulting N,N,S-trimethyl-isothiourea hydrochloride is triturated with acetone and diethyl ether, and is recrystallized from isopropanol, M.P. 176–177° (with decomposition).

*Example 7*

A solution of 6.14 g. of 1-(3-aminopropyl)-3-benzhydrylpiperidine and 2.6 g. of S-methyl-isothiourea hydrochloride in 15 ml. of absolute ethanol is refluxed for three hours and is diluted with diethyl ether. The supernatant liquid is decanted from the oily product and is triturated three times with diethyl ether. The solid material is dissolved in ethyl methyl ketone, the solution is filtered and diluted with diethyl ether. After repeating this procedure twice, the 3-benzhydryl-1-(3-guanidino-propyl)-piperidine hydrochloride of the formula

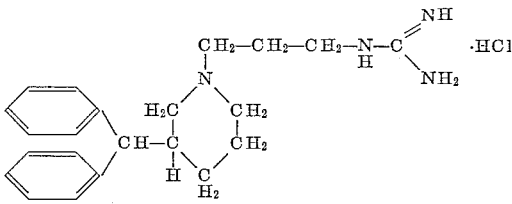

is ground in a mortar under diethyl ether to yield a non-hygroscopic, amorphous white solid which contains a half mole of water.

The starting material used in the above procedure is prepared as follows: A mixture of 22.0 g. of 3-benzhydryl-piperidine, 25 g. of N-(3-bromopropyl)-phthalimide and 26.0 g. of anhydrous sodium carbonate in 300 ml. of toluene containing 2 ml. of water is refluxed for twenty-four hours while vigorously stirring, and is then filtered hot. The solvent is evaporated under reduced pressure and the resulting residue is dissolved in isopropanol. The solution is treated with an equivalent amount of hydrogen chloride in ethanol, and the resulting product is filtered off, washed with isopropanol and diethyl ether and dried under reduced pressure. It is dissolved in methylene chloride; the organic solution is shaken with an excess of a dilute sodium hydroxide solution, dried and evaporated under reduced pressure to yield 29.1 g. of N-[3-(3-benzhydryl-1-piperidino)-propyl]-phthalimide.

A solution of 29.1 g. of N-[3-(3-benzhydryl-1-piperidino)-propyl]-phthalimide in 80 ml. of 95 percent ethanol is refluxed for two hours with 3.35 g. of hydrazine hydrate (100%). After cooling and acidifying to Congo Red with concentrated hydrochloric acid, the solid material is filtered off and washed with 95 percent ethanol. The combined filtrates are concentrated to a low volume and upon dilution with diethyl ether yield an oily product, which is triturated several times with diethyl ether, and dissolved in methylene chloride. The organic solution is washed with dilute aqueous sodium hydroxide, dried and evaporated to yield 10.9 g. of 1-(3-aminopropyl)-3-benzhydryl-piperidine, collected at 152–165°/0.025 mm.

It is converted into the amorphous dihydrochloride by treating a solution of 1-(3-aminopropyl)-3-benzhydryl-piperidine in diethyl ether with dry hydrogen chloride, and dissolving the amorphous product in isopropanol and precipitating it with diethyl ether. The resulting salt contains one mole of water.

*Example 8*

A mixture of 5.88 g. of 1-(2-aminoethyl)-2-benzhydryl-piperidine and 2.6 g. of S-methyl-isothiourea hydrochloride in 15 ml. of anhydrous ethanol is refluxed for three hours and is then allowed to stand for 2½ days at room temperature. Upon adding diethyl ether, an oily precipitate is formed, which is triturated with diethyl ether and then dissolved in ethyl methyl ketone, from which it is reprecipitated by adding diethyl ether. After repeating the last step twice, the desired 2-benzhydryl-1-(2 - guanidino - ethyl) - piperidine hydrochloride of the formula

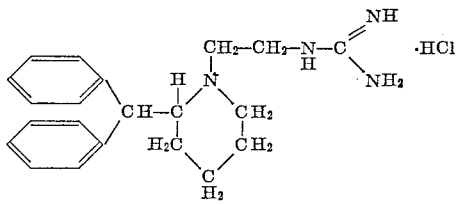

is redissolved in isopropanol and precipitated with diethyl ether; it is amorphous and contains a half mole of water; yield: 2.6 g.

The starting material used in the above procedure is prepared as follows: To a suspension of 31.0 g. of 2-benzhydryl-piperidine hydrochloride, 4.2 g. of paraformaldehyde and 9.9 g. of sodium acetate in 93 ml. of acetic acid is added dropwise a solution of 7.8 g. of sodium cyanide in 23.4 ml. of water while stirring and maintaining the temperature at 13–16°. After stirring at 15–20° for two hours and at 50–53° for six hours, the reaction mixture is allowed to stand overnight and is then treated with 1.5 ml. of a 37 percent aqueous solution of formaldehyde which is added over a period of thirty minutes and at a temperature at 50°. The reaction mixture is poured into water, made basic with sodium hydroxide and extracted three times with chloroform. The organic extract is dried, the solvent is evaporated and the resulting 2-benzhydryl-1-cyanomethyl-piperidine is purified by distillation and collected at 177–193°/0.07 mm.; yield: 17.1 g.

To a suspension of 4.5 g. of lithium aluminum hydride in 150 ml. of tetrahydrofuran is added over a period of thirty minutes 17.1 g. of 2-benzhydryl-1-cyanomethyl-piperidine in 100 ml. of tetrahydrofuran. After stirring for thirty minutes at room temperature and standing overnight, the reaction mixture is treated with 13.5 ml. of ethyl acetate, 4.5 ml. of water, 9 ml. of a 15 percent aqueous solution of sodium hydroxide and 13.5 ml. of water. The solid material is filtered off, the filtrate is evaporated and the desired 1-(2-aminoethyl)-2-benzhydryl-piperidine of the formula

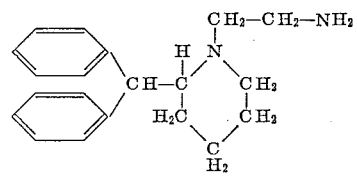

is purified by distillation and collected at 152–170°/0.05 mm.; yield: 12.1 g. Its dihydrochloride melts at 188° (with decomposition) after recrystallization from isopropanol.

*Example 9*

A mixture of 5.0 g. of 1-(2-aminoethyl)-3-benzhydryl-piperidine and 2.4 g. of N,S-dimethyl-isothiourea hydrochloride in 15 ml. of anhydrous ethanol is refluxed for three hours and evaporated under reduced pressure. The residue is treated with acetone, the solvent is removed under reduced pressure and the procedure is repeated three times. An acetone solution of the resulting product is carefully treated with diethyl ether; after scratching, the white crystalline 3-benzhydryl-1-[2-(3-methyl-guanidino)-ethyl]-piperidine hydrochloride of the formula

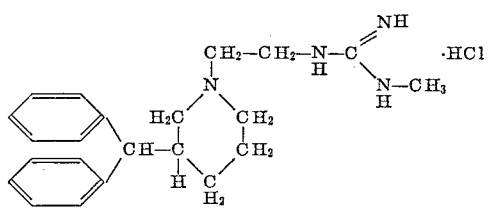

precipitates. It melts at 125–129° (with decomposition) and contains a half mole of water; yield: 5.0 g.

*Example 10*

A solution of 3.5 g. of 1-(2-aminoethyl)-3-benzhydryl-piperidine and 2.2 g. of N,N'-diethyl-S-methyl-isothiourea hydrochloride in 15 ml. of anhydrous ethanol is refluxed for three hours; the solvent is removed and the residue is triturated five times with acetone and the desired 3 - benzhydryl - 1[2 - (2,3 - diethyl - guanidino) - ethyl]-piperidine hydrochloride of the formula

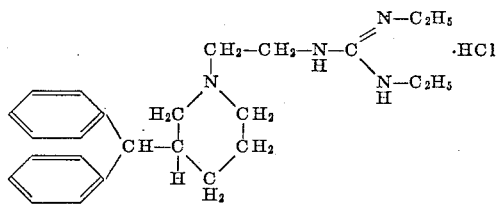

containing one mole of water, is finally obtained as an amorphous product by trituration with diethyl ether; yield: 4.5 g.

*Example 11*

A solution of 6.5 g. of 1-(2-aminoethyl)-3-di-(4-methylphenyl)-methyl-piperidine and 2.5 g. of S-methyl-isothiourea hydrochloride in 30 ml. of anhydrous ethanol is refluxed for three hours and is then allowed to stand overnight at room temperature. Upon diluting it with diethyl ether and scratching, a crystalline material is obtained which is recrystallized twice from a mixture of ethanol and diethyl ether. The resulting product appears to be a mixture of the monohydrochloride and the dihydrochloride of 3-di-(4-methyl-phenyl)-methyl-1-(2-guanidino-ethyl)-piperidine of the formula

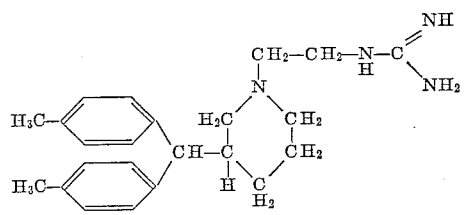

The product (M.P. 132–134° with decomposition; yield: 4.0 g.) is dissolved in ethanol and treated with a solution of hydrogen chloride in ethyl acetate; the resulting dihydrochloride salt contains one mole of water.

The starting material used in the above procedure is prepared as follows: The solution of 68 ml. of a butyl lithium solution in hexane (14.9 g. per 100 ml.), in 50 ml. of anhydrous diethyl ether is chilled to −70° and treated with a solution of 15.8 g. of 3-bromo-pyridine in 75 ml. of anhydrous diethyl ether, which is added while stirring and over a period of thirty minutes. After stirring at −70° for fifteen minutes, a solution of 21.0 g. of 4,4′-dimethyl-benzophenone in 200 ml. of anhydrous diethyl ether is added dropwise over a period of two hours. Stirring is continued at −15° for two hours, and the reaction mixture is then decomposed by adding 100 ml. of water while stirring. The aqueous layer is extracted with chloroform, the organic extract is dried, the solvent is removed and the residue is crystallized by trituration with petroleum ether. The resulting product represents the di-(4-methyl-phenyl)-3-pyridyl-methanol, which melts at 120–123° after recrystallization from a mixture of benzene and petroleum ether.

A mixture of 13.5 g. of di-(4-methyl-phenyl)-3-pyridyl-methanol and 4.0 g. of platinum oxide in 200 ml. of a 4.5 N solution of hydrogen chloride in ethanol and 150 ml. of ethanol is treated with hydrogen at an initial pressure of about 3½ atmospheres. Within four hours, the theoretical amount of hydrogen is absorbed; the catalyst is filtered off and the filtrate is evaporated under reduced pressure. The residue is dissolved in hot water, the solution is made basic with a 50 percent solution of sodium hydroxide in water, and the organic material is extracted with ethyl acetate. The extract is evaporated under reduced pressure to yield the desired 3-di-(4-methyl-phenyl)-methyl-piperidine which is used without further purification.

A mixture of 12.9 g. of 3-di-(4-methyl-phenyl)-methyl-piperidine and 1.7 g. of paraformaldehyde in 40 ml. of glacial acetic acid is cooled to 10–15° while stirring and is treated dropwise with a solution of 2.7 g. of sodium cyanide in 8 ml. of water. After stirring for one hour at 10–15°, the temperature is raised to 40–45° and stirring is continued for five hours. After standing overnight at room temperature, the reaction mixture is diluted with water and extracted with benzene. The dried organic extract is evaporated, the residue is dissolved in methylene chloride, washed twice with dilute ammonia, dried and evaporated. The residue is distilled under reduced pressure to yield 11.5 g. of 1-cyanomethyl-3-di-(4-methyl-phenyl)-methyl-piperidine, which is dried under reduced pressure.

A solution of 11.5 g. of 1-cyanomethyl-3-di-(4-methyl-phenyl)-methyl-piperidine in 100 ml. of tetrahydrofuran is added while stirring and over a period of one hour to a suspension of 2.7 g. of lithium aluminum hydride in 45 ml. of tetrahydrofuran. After stirring for one day at room temperature, the reaction mixture is treated with 8.1 ml. of ethyl acetate, 2.7 ml. of water, 5.4 ml. of a 15 percent aqueous solution of sodium hydroxide and 8.1 ml. of water, and then filtered. The solid material is washed with tetrahydrofuran; the combined filtrates are evaporated under reduced pressure, and the desired 1-(2-aminoethyl)-3-di-(4-methyl-phenyl)-methyl-piperidine of the formula

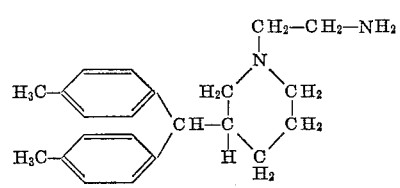

is purified by distillation and collected at 126–134°/0.4 mm.; yield: 6.8 g.

*Example 12*

A solution of 5.9 g. of 1-(2-aminoethyl)-3-benzhydryl-piperidine and 3.5 g. of N-allyl-S-methyl-isothiourea hydrochloride in 35 ml. of anhydrous ethanol is refluxed for three hours, then cooled and treated with diethyl ether. The resulting gummy precipitate is triturated with diethyl ether to yield an amorphous solid, which is dissolved in ethyl methyl ketone. The solution is treated with a charcoal preparation, diluted with ethyl acetate until it becomes turbid, and then poured into a large volume of ethyl acetate. The resulting 1-[2-(N-allyl-guanidino)-ethyl]-3-benzhydryl-piperidine hydrochloride of the formula

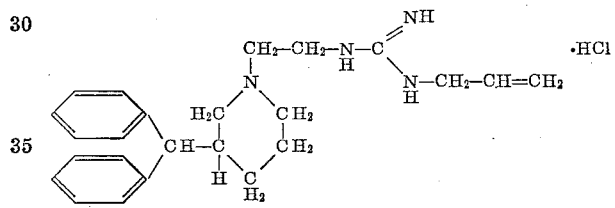

is finally triturated with diethyl ether, but remains amorphous (yield: 5.0 g.).

*Example 13*

A solution of 4.1 g. of 1-(2-aminoethyl)-3-benzhydryl-piperidine and 2.25 g. of N-ethyl-S-methyl-isothiourea hydrochloride in 10 ml. of anhydrous ethanol is refluxed for three hours, cooled and diluted with a large volume of diethyl ether. The oily residue is triturated twice with diethyl ether, redissolved in ethanol and precipiated with diethyl ether, and again triturated with diethyl ether. After dissolving the product in isopropanol and precipitating it with diethyl ether, it is ground in a mortar under diethyl ether to yield the amorphous 3-benzhydryl-1-[2-(3-ethyl-guanidino)-ethyl]-piperidine hydrochloride of the formula

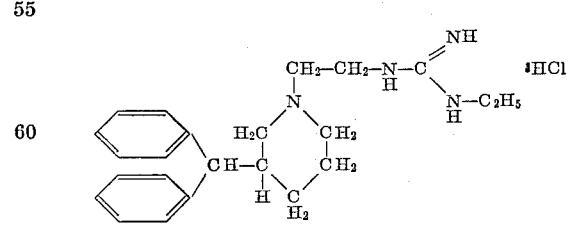

which is dried under reduced pressure and in the presence of phosphorus pentoxide; it contains one mole of water.

*Example 14*

A mixture of 2.6 g. of N,N′,S-trimethyl-isothiourea hydrochloride and 5.0 g. of 1-(2-aminoethyl)-3-benzhydryl-piperidine in 25 ml. of ethanol is refluxed for fifteen hours and is then evaporated under reduced pressure. The residual red oil is dissolved in acetone; the solvent is distilled off and replaced by ethyl methyl ketone. The desired 3 - benzhydryl - 1 - [2-(2,3-dimethyl-guanidino)-ethyl]-piperidine hydrochloride of the formula

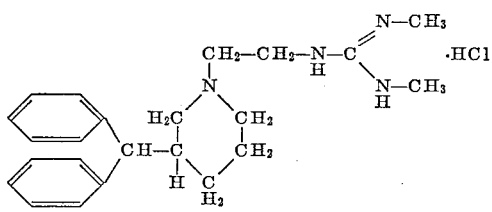

crystallizes on adding diethyl ether and scratching, and is again recrystallized from a mixture of ethyl methyl ketone and diethyl ether. The hygroscopic product melts at 130–133°; yield: 5.5 g.

*Example 15*

A mixture of 4.94 g. of 3-benzhydryl-1-(2-N-methyl-amino-ethyl)-piperidine and 2.26 g. of S-methyl-iso-thiourea hydrochloride in 10 ml. of ethanol is refluxed for five hours and then concentrated under reduced pressure. The residue is dissolved in acetone and precipitated with diethyl ether. The resulting 3-benzhydryl-1-[2-(1-methyl-guanidino)-ethyl]-piperidine hydrochloride of the formula

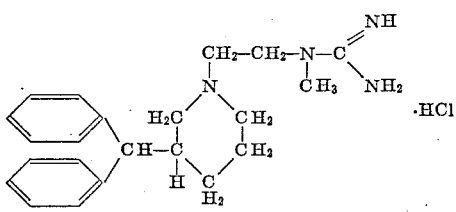

is dried under reduced pressure without heating and melts at 132–142°, containing one mole of water; yield: 4.0 g.

The starting material used in the above procedure is prepared as follows: A mixture of 20.0 g. of 3-benzhydryl-piperidine in 50 ml. of benzene is added while vigorously stirring to a solution of 9.95 g. of ethylene bromohydrin in 100 ml. of benzene containing 15.0 g. of sodium carbonate and a few drops of water. After refluxing and stirring for twenty hours, the solid material is filtered off, the filtrate is concentrated under reduced pressure and the desired 3-benzhydryl-1-(2-hydroxyethyl)-piperidine is purified by distillation and collected at 157–164°/0.15 mm.; yield: 18.0 g.

A solution of 16.0 g. of 3-benzhydryl-1-(2-hydroxyethyl)-piperidine in 50 ml. of benzene is treated slowly with 7.1 g. of thionyl chloride in 100 ml. of benzene while stirring. After the addition is complete, the solution is refluxed for four hours, stirred overnight at room temperature and then concentrated under reduced pressure. The oily 3-benzhydryl-1-(2-chloroethyl)-piperidine hydrochloride crystallizes on adding benzene, M.P. 115–120°; yield: 19.7 g.

A mixture of a solution of 10.84 g. of 3-benzhydryl-1-(2-chloroethyl)-piperidine hydrochloride in 25 ml. of ethanol, 50 ml. of a 33 percent solution of N-methylamine in ethanol, and 5.5 g. of anhydrous potassium carbonate is refluxed for 2½ hours, then stirred overnight at room temperature, filtered, and concentrated under reduced pressure. The residue is treated with water and a 50 percent aqueous solution of potassium hydroxide, the organic material is extracted with diethyl ether, and the organic solution is dried and evaporated. The desired 3-benzhydryl-1-(2-N-methylaminoethyl)-piperidine is obtained as a yellow oil by distilling the residue and is collected at 165–168°/0.15 mm.; yield: 5.0 g.

*Example 16*

A mixture of 5.0 g. of 1-(2-aminoethyl)-3-di-(4-chloro-phenyl)-methyl-piperidine and 1.75 g. of S-methyl-iso-thiourea hydrochloride in 20 ml. of ethanol is refluxed for five hours. The reaction mixture is concentrated under reduced pressure to yield the 3-di-(4-chloro-phenyl)-methyl-1-(2-guanidino-ethyl)-piperidine hydrochloride of the formula

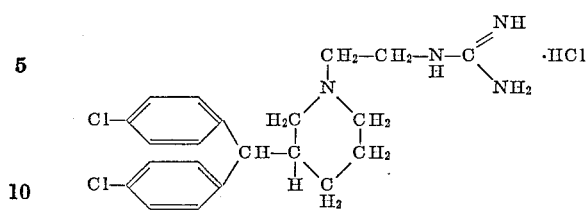

which is recrystallized from a mixture of acetone and diethyl ether and dried at 60° under reduced pressure. The hygroscopic product softens at 80–87° and melts to a yellow oil at 150–190°.

The starting material used in the above procedure is prepared as follows: A solution of 21.4 g. of 3-pyridine carboxaldehyde in 50 ml. of chlorobenzene is added dropwise to a dispersion of 40 ml. of concentrated sulfuric acid and 30 ml. of chlorobenzene; during the addition, the temperature rises to 60–70°. After heating at 85° for twenty hours, while stirring, the reaction mixture is cooled, poured onto ice and neutralized with sodium carbonate. The 3-di-(4-chloro-phenyl)-methyl-pyridine is extracted with chloroform, the organic solution is dried and concentrated, and the residue is distilled; the desired product is collected at 194–196°/0.3 mm.; yield: 16.0 g.

A solution of 15.7 g. of 3-di-(4-chloro-phenyl)-methyl-pyridine in 50 ml. of glacial acetic acid is treated with hydrogen under a pressure of about 3.2 atmospheres and in the presence of 2.5 g. of platinum oxide while maintaining a temperature of 40°. The catalyst is filtered off, the filtrate is evaporated and the desired 3-di-(4-chloro-phenyl)-methyl-piperidine is purified by distillation and collected at 170°/0.23 mm.; yield: 14.0 g. Its hydrochloride salt, M.P. 97–100°, is prepared by treatment with a solution of hydrogen chloride in ethanol.

A mixture of 36.9 g. of 3-di-(4-chloro-phenyl)methyl-piperidine, 29.4 g. of N-(2-bromoethyl)-phthalimide, and 34.0 g. of sodium carbonate in 400 ml. of toluene containing 1 ml. of water is refluxed for 24 hours while stirring. After filtering and concentrating the filtrate under reduced pressure, the crude oily N-{2-[3-di-(4-chloro-phenyl)-methyl-1-piperidino]-ethyl} - phthalimide (yield: 60 g.) dissolved in 500 ml. of methanol is refluxed for 24 hours in the presence of 20 ml. of hydrazine hydrate (99–100%). The reaction mixture is acidified with concentrated hydrochloric acid, refluxed for two hours and filtered hot. The filtrate is concentrated under reduced pressure, and the solid residue is dissolved in a minimum amount of water. The aqueous solution is made basic with a 50 percent aqueous solution of potassium hydroxide, and is extracted with diethyl ether; the aqueous layer is saturated with potassium carbonate and the organic material is extracted with diethyl ether. The organic solutions are combined, concentrated under reduced pressure and distilled; the desired 1-(2-aminoethyl)-3-di-(4-chloro-phenyl)-methyl-piperidine of the formula

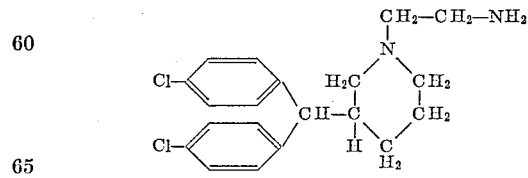

is collected at 150°–190°/0.1 mm. Its dihydrochloride melts at 90–95° after recrystallization from methanol.

*Example 17*

A mixture of 5.0 g. of 1-(2-aminoethyl)-3-di-(4-chloro-phenyl)-methyl-piperidine and 1.93 g. of N,S-dimethyl-isothiourea hydrochloride in 10 ml. of ethanol is refluxed for six hours and then concentrated under reduced pressure. The residue is recrystallized from a mixture of acetone and diethyl ether to yield the 3-di-(4-chloro-phenyl)- methyl-1-[2-(3-methyl-guanidino) - ethyl]-piperidine hydrochloride of the formula

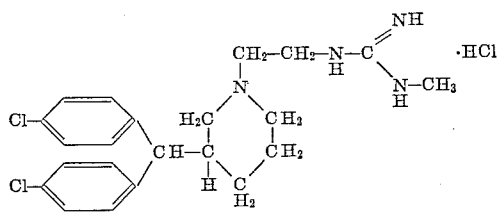

which softens at 88° and melts to a clear oil at 135°.

*Example 18*

A solution of 4.0 g. of 1-(2-aminoethyl)-4-benzhydryl-piperidine in 6.0 ml. of 95% ethanol is added to 1.9 g. of S-methyl-isothiourea sulfate in 3 ml. of water; the reaction is refluxed for three hours. After cooling and adding 500 ml. of acetone, the desired 4-benzhydryl-1-(2-guanidino-ethyl)-piperidine sulfate is obtained; it melts at 197–198° after recrystallization from a mixture of 95% ethanol and acetone.

*Example 19*

A mixture of 7.6 g. of 1-(2-aminoethyl)-3-(α-cyclohexyl-benzyl)-piperidine and 3.2 g. of S-methyl-isothiourea hydrochloride in 15 ml. of ethanol is refluxed for 5½ hours. The solvent is removed under reduced pressure, and the remaining oil is triturated three times with acetone and three times with diethyl ether to yield the amorphous 3-(α-cyclohexyl-benzyl)-1-(2-guanidino - ethyl)-piperidine hydrochloride of the formula

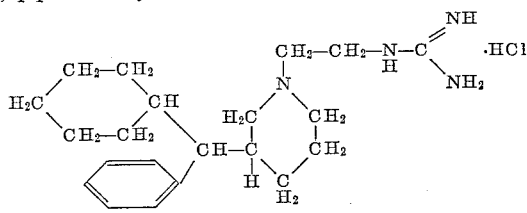

yield: 8.0 g.

The starting material used in the above procedure is prepared as follows: A soution of 24.5 g. of 3-benzhydryl-pyridine in 300 ml. of glacial acetic acid containing 12.2 g. of a palladium catalyst (10 percent palladium on charcoal) is treated with hydrogen under a pressure of 133.5 atmospheres and at a temperature of 100°. The hydrogenation reaction is interrupted after twenty-one hours; the reaction mixture is filtered, the catalyst is washed with glacial acetic acid, and the combined filtrates are evaporated under reduced pressure to yield a viscous colorless oil which is taken up in water. The aqueous mixture is made basic with a 50 percent aqueous solution of sodium hydroxide and extracted with diethyl ether. The organic solution is gassed with hydrogen chloride to yield a gummy material, which is dissolved in water, made basic and extracted with diethyl ether. The solvent is evaporated after drying to yield the 3-(α-cyclohexyl-benzyl)-piperidine, which is purified by distillation and collected at 135–138°/0.1 mm.

A mixture of 10.4 g. of 3-(α-cyclohexyl-benzyl)-piperidine and 1.4 g. of paraformaldehyde in 31.2 ml. of glacial acetic acid is treated over a period of fifteen minutes with 2.4 g. of sodium cyanide in 6 ml. of water, while stirring and a temperature of 15°. Stirring is continued for one hour at 15° and five hours at 40–45°, and the reaction mixture is allowed to stand overnight at room temperature. After heating to 40°, 1.5 ml. of a 40 percent aqueous solution of formaldehyde is added; the reaction mixture is again stirred for fifteen minutes, then cooled and treated with 3 ml. of water. The organic material is extracted with two portions of methylene chloride and one portion of benzene; the organic extracts are washed with an aqueous solution of sodium carbonate, dried and evaporated. The resulting 1-cyanomethyl-3-(α-cyclohexyl-benzyl)-piperidine is purified by distillation and collected at 142–143°/0.025 mm.; yield: 8.5 g.

A mixture of 8.5 g. of 1-cyanomethyl-3-(α-cyclohexyl-benzyl)-piperidine in 50 ml. of tetrahydrofuran is added over a period of one hour to 2.3 g. of lithium aluminum hydride in 50 ml. of tetrahydrofuran under an atmosphere of nitrogen. After stirring for three hours at room temperature and standing overnight, the reaction mixture is cooled in an ice bath and treated in sucession with 6.9 ml. of ethyl acetate, 2.3 ml. of water, 4.6 ml. of a 15 percent aqueous solution of sodium hydroxide in water, and 6.9 ml. of water. After stirring for one hour at room temperature, the solid material is filtered off, washed three times with tetrahydrofuran; the filtrates are evaporated under reduced pressure. The resulting 1-(2-aminoethyl)-3-(α-cyclohexyl-benzyl)-piperidine of the formula

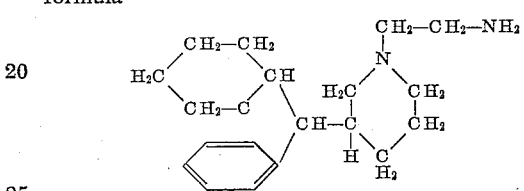

is distilled and collected at 170°/0.045 mm.; yield: 7.6 g.

*Example 20*

A warm solution of 5.0 g. of 1-(2-aminoethyl)-3-benzhydryl-piperidine in 25 ml. of ethanol is added to 2.3 g. of S-methyl-N-nitro-isothiourea and is refluxed for three hours. After standing overnight at room temperature, the crystalline precipitate is filtered off, and is washed with acetone to yield the 3-benzhydryl-1-[2-(3-nitro-guanidino)-ethyl]-piperidine of the formula

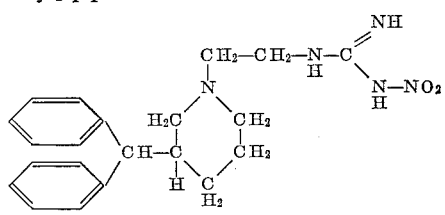

which melts at 178–180° (with decomposition) after recrystallization from a small amount of ethyl methyl ketone; yield: 4.7 g.

*Example 21*

A mixture of 7.9 g. of 1-(2-aminoethyl)-3-di-(4-methoxy-phenyl)-methyl-piperidine and 2.8 g. of S-methyl-isothiourea hydrochloride in 25 ml. of ethanol is refluxed for three hours, then cooled to room temperature and poured into an excess of diethyl ether. The resulting 1-(2-guanidino - ethyl) - 3 - di - (4 - methoxy - phenyl) - methyl-piperidine hydrochloride of the formula

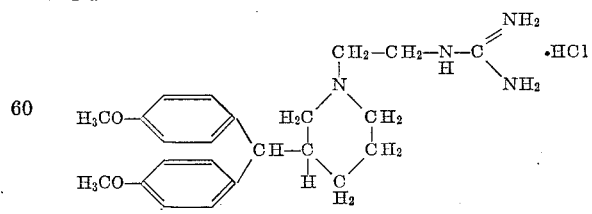

is recrystallized from a mixture of ethanol and diethyl ether, M.P. 128–132° (with decomposition).

The starting material used in the above procedure is prepared as follows: A mixture of 12.8 g. of 3-di-(4-methoxy-phenyl)-methyl-pyridine hydrochloride in 150 ml. of anhydrous ethanol and 10 ml. of a 4.5 N solution of hydrogen chloride in ethanol containing 3.0 g. of platinum oxide is treated with hydrogen under a pressure of about 3.2 atmospheres and at room temperature. After seven hours, the hydrogenation is interrupted, the catalyst is filtered off, and the filtrate is evaporated under reduced pressure. The residue is dissolved in water, the aqueous solution is made basic with a 50 percent aqueous solution of sodium hydroxide, and extracted with ethyl acetate. The organic solution is dried over magnesium sulfate and evaporated to yield the oily 3-di-(4-methoxy-phenyl)-methyl-piperidine, which is used without further purification; yield: 10.5 g.

A solution of 1.6 g. of sodium cyanide in 4.8 ml. of water is added to 10.5 g. of 3-di-(4-methoxy-phenyl)-methyl-piperidine and 1.2 g. of paraformaldehyde in 30 ml. of glacial acetic acid while maintaining a temperature of 10–15° and stirring. After stirring for five hours at 45°, the reaction mixture is cooled, diluted with 25 ml. of water and extracted with benzene. The organic solution is evaporated, and the oily residue is dissolved in methylene chloride. The organic solution is washed with dilute aqueous ammonia, dried over magnesium sulfate and evaporated. The resulting 1-cyanomethyl-3-di-(4-methoxy-phenyl) methyl-piperidine melts at 55–57°; yield: 9.0 g.

A solution of 9.0 g. of 1-cyanomethyl-3-di-(4-methoxy-phenyl)-methyl-piperidine in 100 ml. of tetrahydrofuran is added over one hour to 2.1 g. of lithium aluminum hydride in 45 ml. of tetrahydrofuran; the reaction mixture is stirred at room temperature under an atmosphere of nitrogen. After stirring for one day, the reaction mixture is cooled and treated dropwise with 6.3 ml. of ethyl acetate, 2.1 ml. of water, 4.2 ml. of a 15 percent aqueous solution of sodium hydroxide, and 6.3 ml. of water, stirred for one hour at room temperature and filtered. The filtrate is evaporated; the resulting 1-(2-aminoethyl)-3-di-(4-methoxy-phenyl)-methyl-piperidine of the formula

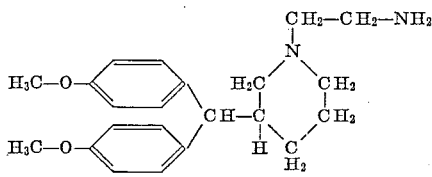

solidifies, but is amorphous; yield: 7.9 g.

*Example 22*

A mixture of 10.2 g. of the (+)-1-(2-aminoethyl)-3-benzhydryl-piperidine and 4.4 g. of S-methyl-isothiourea hydrochloride in 30 ml. of ethanol is allowed to stand for four days at room temperature while occasionally stirring, and then diluted with diethyl ether. The gummy solid is triturated with diethyl ether, redissolved in isopropanol, filtered and diluted with three times the volume of a mixture of ethyl acetate and diethyl ether. The resulting solid material is triturated with diethyl ether, filtered and dried under reduced pressure to yield the (+)-1-(2-guanidino-ethyl) - 3 - benzhydryl-piperidine hydrochloride, which is recrystallized from a mixture of isopropanol, ethyl acetate and diethyl ether, M.P. 170°;

$[\alpha]_D^{25} = +4.29°$

The starting material used in the above procedure is prepared as follows: A solution of 39.0 g. of the racemic 1-(2-aminoethyl)-3-benzhydryl-piperidine in 30 ml. of ethanol is added to 19.9 g. of D-tartaric acid in 70 ml. of ethanol. After the exothermic reaction subsides, the reaction mixture is cooled to yield a gummy material which crystallizes after dilution with ethanol, is filtered off, washed with ethanol and dried. The resulting product melts at 174–177°; $[\alpha]_D^{25} = +19.48°$; yield 56.0 g., and is recrystallized twice from 80 percent ethanol (M.P. 193–193.5 with decomposition; $[\alpha]_D^{25} = +17.16$), once from 60 percent ethanol (M.P. 195.5–196° with decomposition; $[\alpha]_D^{25} = +15.45°$), once from 40 percent ethanol ($[\alpha]_D^{25} = +15.50°$), and three times from 25 percent ethanol to yield 28.0 g. of the hygroscopic (+)-1-(2-aminoethyl)-3-benzhydryl-piperidine D-tartrate, which is once more recrystallized from 25 percent ethanol; $[\alpha]_D^{25} = +12.56°$.

A solution of the above (+)-1-(2-aminoethyl)-3-benzhydryl-piperidine D-tartrate in water is treated with concentrated aqueous ammonium hydroxide and extracted with methylene chloride. The organic solution is dried and evaporated under reduced pressure and at low temperature; the resulting (+)-1-(2-aminoethyl)-3-benzhydryl-piperidine has an $[\alpha]_D^{25} = +1.12°$; yield: 10.2 g., and its dihydrochloride melts at 148° after recrystallization from a mixture of isopropanol and diethyl ether.

*Example 23*

A mixture of 4.2 g. of (−)-1-(2-aminoethyl)-3-benzhydryl-piperidine and 1.8 g. of S-methyl-isothiourea hydrochloride in 10 ml. of isopropanol is allowed to stand for four days at room temperature. The amorphous product is triturated with diethyl ether, dissolved in ethyl methyl ketone and precipitated with diethyl ether. The resulting (−)-3-benzhydryl-1-(2-guanidino-ethyl) - piperidine hydrochloride is dried at 50° and softens at 130°, $[\alpha]_D^{25} = -2.38°$; yield: 3.0 g.

The starting material used in the above procedure is prepared as follows: A solution of 12.5 g. of racemic 1-(2-aminoethyl)-3-benzhydryl-piperidine in ethanol and a solution of 6.4 g of L-tartaric acid in ethanol are combined, a total of 70 ml. of ethanol being used. After cooling, a solid material precipitates, which as allowed to stand overnight at room temperature and then filtered off and is washed with ethanol. It melts at 182–184° (with decomposition) after recrystallization from 70 percent ethanol, and is recrytsallized four times from 50 percent ethanol; after two recrystallizations, the melting point is 191–192° (with decomposition); $[\alpha]_D^{25} = -10.27°$. The resulting (−)-1-(2-aminoethyl)-3-benzhydryl-piperidine L-tartrate, $[\alpha]_D^{25} = -12.98°$, is converted into the free base with concentrated aqueous ammonium hydroxide as described in Example 22; yield: 4.2 g.

*Example 24*

A mixture of 5.0 g. of 1-(2-aminoethyl)-3-(9-fluorenyl)-piperidine and 2.1 g. of S-methyl-isothiourea hydrochloride in 20 ml. of anhydrous ethanol is allowed to stand at room temperature for three days. The reaction mixture is filtered, the filtrate is poured into an excess of diethyl ether and the solvent is decanted. The resulting residue is triturated several times with diethyl ether to yield the 3-(9-fluorenyl)-1-(2-guanidino-ethyl)-piperidine hydrochloride of the formula

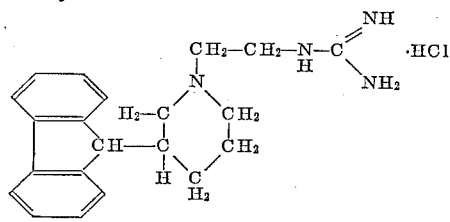

which melts at 150–151° as the hemihydrate; yield: 5.0 g.

The starting material used in the above procedure is prepared as follows: A total of 135 ml. of a solution of butyl lithium in hexane (containing 14.94 g. of butyl lithium per 100 ml. of solution) is chilled to −70°, and is then treated with 31.6 g. of 3-bromo-pyridine in 150 ml. of anhydrous diethyl ether, added over a period of 30 minutes. The reaction mixture is stirred for 15 minutes at −70°, and is then treated over a period of two hours with a solution of 36.4 g. of 9-fluorenone in 400 ml. of anhydrous diethyl ether while maintaining the temperature at that level. It is then brought to −15° and maintained for two hours, whereupon the reaction mixture is treated dropwise with 100 ml. of water while stirring. It is then made basic with a 50 percent aqueous solution of sodium hydroxide; the two layers are separated and the aqueous phase is extracted twice with methylene chloride. The combined organic solutions are dried over magnesium sulfate and evaporated to yield a light yellow solid, which is triturated with hexane and dried to yield 42.3 g. of 3-(9-hydroxy-9-fluorenyl)-pyridine; it melts at 149–149.5° after recrystallization from ethyl acetate.

A solution of 21.5 g. of 3-(9-hydroxy-9-fluorenyl)-pyridine in 150 ml. of glacial acetic acid containing 7.0 g. of a 10 percent palladium-on-charcoal preparation, is treated at 60° with hydrogen at an initial pressure of about 3.2 atmospheres. After four hours, the hydrogenation reaction is interrupted, the catalyst is removed by filtration, and the filtrate is evaporated under reduced pressure. The residue is taken up in water, the aqueous solution is made basic with 25 percent aqueous sodium hydroxide and the organic material is extracted with methylene chloride; the organic extract is dried over magnesium sulfate and evaporated. The oily residue is distilled to yield the 3-(9-fluorenyl)-piperidine, which is collected at 160–165°/0.25 mm.; yield: 13.4 g. Its hydrochloride salt melts at 127–130° (with decomposition).

A suspension of 10.0 g. of 3-(9-fluorenyl)-piperidine and 1.4 g. of paraformaldehyde in 30 ml. of glacial acetic acid is stirred at 10–15°, while a solution of 2.4 g. of sodium cyanide in 7.2 ml. of water is added dropwise over a period of five minutes. The reaction mixture is stirred for one hour at 10–15° and for two hours at 25°, whereupon the temperature is raised to 40–45° and maintained for five hours. The cloudy solution obtained after standing overnight at room temperature is treated with 15 ml. of water and the organic material is extracted with benzene. The dried organic extract is evaporated and the residue is distilled to yield the 1-cyanomethyl-3-(9-fluorenyl)-piperidine, which is collected at 175–180°/0.05 mm.; yield: 9.1 g.

A solution of 9.1 g. of 1-cyanomethyl-3-(9-fluorenyl)-piperidine in 50 ml. of dry tetrahydrofuran is added dropwise to a suspension of 2.4 g. of lithium aluminum hydride in 55 ml. of tetrahydrofuran over a period of two hours. The reaction mixture is stirred for 24 hours at room temperature and is then treated with 7.2 ml. of ethyl acetate, 2.4 ml. of water, 4.8 ml. of a 15 percent aqueous solution of sodium hydroxide and 7.2 ml. of water in that order. After stirring for 30 minutes, the reaction mixture is filtered and the filtrate is evaporated to leave 5.0 g. of the 1-(2-aminoethyl)-3-(9-fluorenyl)-piperidine as a light yellow oil which is used without further purification.

*Example 25*

A mixture of 2.96 g. of 1-(2-aminoethyl)-3-benzhydryl-piperidine and 1.53 g. of 2-methylmercapto-2-imidazoline hydrochloride in 6 ml. of ethanol is refluxed for three hours. After cooling, the reaction mixture is added to an excess of diethyl ether, whereupon the desired 3-benzhydryl - 1 - [2 - (2 - imidazolin-2-yl-amino)-ethyl]-piperidine hydrochloride of the formula

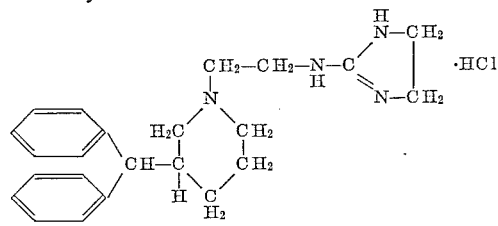

is obtained on scratching. It melts at 217–220° (with decomposition) as the hemihydrate, after recrystallization from a mixture of isopropanol and diethyl ether.

The reagent used in the above procedure is prepared as follows: To a solution of 22.0 g. of hydrogen chloride in 160 ml. of absolute methanol is added 19.52 g. of 2-(S-methyl-mercapto)-2-imidazoline hydriodide; the reaction mixture is evaporated to dryness in an open vessel, and the residue is recrystallized from a mixture of ethanol and diethyl ether to yield the 2-(S-methyl-mercapto)-2-imidazoline hydrochloride, M.P. 170–173°, after drying for sixteen hours at 30° and under reduced pressure; yield: 11.1 g.

*Example 26*

A mixture of 8.4 g. of 1-(2-aminoethyl)-3-[α-(4-fluorophenyl)-benzyl]-piperidine and 3.8 g. of S-methyl-isothiourea hydrochloride in 50 ml. of ethanol is refluxed for six hours and concentrated under reduced pressure. The resulting oil is dissolved in a minimum amount of methanol; the solution is diluted with diethyl ether to yield 9.4 g. of the strongly hygroscopic 3-[α-(4-fluorophenyl) - benzyl]-1-(2-guanidino-ethyl)-piperidine hydrochloride of the formula

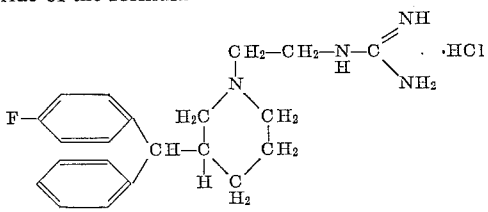

The starting material used in the above procedure is prepared as follows: A solution of 100.0 g. of α-(4-fluorophenyl)-phenylacetonitrile in 100 ml. of toluene is added to 53.5 g. of potassium tertiary butoxide in 500 ml. of toluene while stirring. The reaction mixture is refluxed for four hours and is then cooled and treated with 75.5 g. of 3-bromo-pyridine. After refluxing for 48 hours and cooling, the reaction mixture is poured onto ice and water; the toluene layer is separated and the aqueous phase extracted with three portions of chloroform. The combined organic solutions are washed with water, dried over calcium chloride and evaporated. The residue is distilled to yield the 3-[α-cyano-α-(4-fluoro-phenyl)-benzyl]-pyridine, which is collected at 170–182°/0.4 mm.; yield: 31.2 g.

A mixture of 31.2 g. 3-[α-cyano-α-(4-fluoro-phenyl)-benzyl]-pyridine in 100 ml. of 70 percent aqueous sulfuric acid is heated to 150° for twenty hours and is then poured onto ice and a 40 percent aqueous sodium hydroxide solution. The organic material is extracted three times with diethyl ether; the organic solution is washed with water, dried and evaporated to yield the 3-[α-(4-fluoro-phenyl)-benzyl]-pyridine, which is collected at 150–154°/0.5 mm.; yield: 10.62 g.

A solution of 10.61 g. of 3-[α-(4-fluoro-phenyl)-benzyl]-pyridine in 50 ml. of glacial acetic acid containing 2.1 g. of a platinum oxide catalyst, is treated with hydrogen at an initial pressure of about 3.2 atmospheres and a temperature of 40°. After completion of the hydrogen uptake, the reaction mixture is filtered, the filtrate is concentrated under reduced pressure and the oily residue is dissolved in a minimum amount of water. The aqueous solution is made alkaline with a 40 percent aqueous solution of sodium hydroxide and extracted with diethyl ether; the organic extract is washed with water, dried over calcium carbonate and evaporated. The residual oil is distilled to yield the 3-[α-(4-fluoro-phenyl)-benzyl]-piperidine, which is collected at 128–133°/0.14 mm.; yield: 8.59 g.

A mixture of 8.59 g. of 3-[α-(4-fluoro-phenyl)-benzyl]-piperidine, 8.15 g. of N-(2-bromoethyl)-phthalimide and 9.7 g. of sodium carbonate in 100 ml. of toluene containing 1 ml. of water is refluxed for 24 hours. After filtering off the solid material, the solution is evaporated to yield the oily 3-[α-(4-fluoro-phenyl)-benzyl]-1-[2-(2-phthalimido)-ethyl]-piperidine (yield: 15.45 g.), which is dissolved in 130 ml. of methanol and treated with 25 ml. of hydrazine hydrate (99–100%). After refluxing for twenty hours, the reaction mixture is cooled, acidified with concentrated hydrochloric acid, refluxed for an additional two hours, filtered hot and concentrated under reduced pressure. The residue is dissolved in a minimum amount of water, the aqueous solution is made alkaline with a 50 percent aqueous solution of potassium hydroxide and extracted with diethyl ether. The organic solution is washed, dried and concentrated under reduced pressure to yield the 1-(2-aminoethyl)-3-[α-(4- fluoro-phenyl)-benzyl]-piperidine, which is purified by distillation and collected at 138–160°/0.14 mm.; yield: 8.4 g.

*Example 27*

A mixture of 3.9 g. of 1-(2-aminoethyl)-3-(1,2-diphenyl-ethyl)-piperidine and 1.6 g. of S-methyl-isothiourea hydrochloride in 30 ml. of ethanol is refluxed for six hours. The precipitate is recrystallized from a mixture of acetone and diethyl ether to yield the hygroscopic 3 - (1,2 - diphenyl-ethyl)-1-(2-guanidino-ethyl)-piperidine hydrochloride of the formula

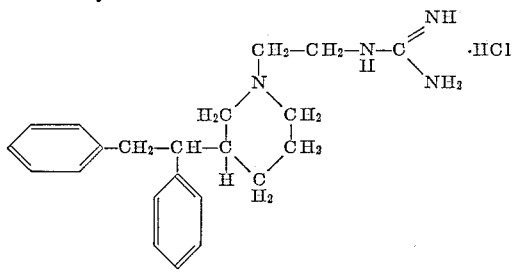

which melts at about 65°; yield: 68 percent.

The starting material used in the above procedure is prepared as follows: A mixture of 117.0 g. of phenylacetonitrile and 112.2 g. of potassium tertiary butoxide in 375 ml. of toluene is placed in a reaction vessel flushed with nitrogen, and refluxed for two hours. After cooling, 159.0 g. of 3-bromo-pyridine is added over a period of ten minutes, and refluxing is continued for one hour. The reaction mixture is cooled overnight and added to water; the toluene layer is extracted with three portions of 4N hydrochloric acid, and the acidic extract is made strongly basic with a 40 percent aqueous solution of sodium hydroxide. The organic material is extracted with three portions of benzene; the organic extract is washed with water, dried and evaporated to yield the 3-(α-cyano-benzyl)-pyridine, which is purified by distillation and collected at 155–170°/0.5 mm.; yield: 30.75 g.

A mixture of 52.33 g. of 3-(α-cyano-benzyl)-pyridine and 33.2 g. of potassium tertiary butoxide in 250 ml. of benzene is heated to 40–50° for 1½ hours, and is then cooled and treated with 50.6 g. of benzyl bromide in 100 ml. of benzene. After stirring at room temperature for one hour and refluxing for 1½ hours, the reaction mixture is poured into water; the benzene layer is washed twice with water, dried and evaporated to yield 77.6 g. of the crude 3-(1-cyano-1,2-diphenyl-ethyl)-pyridine which is used without further purification.

A mixture of 77.6 g. of the crude 3-(1-cyano-1,2-diphenyl-ethyl)-pyridine and 250 ml. of a 70 percent sulfuric acid is heated at 150° for six hours and then poured onto 2,000 g. of ice. The aqueous mixture is made alkaline with a 40 percent aqueous solution of sodium hydroxide and extracted with diethyl ether; the organic solution is washed three times with water, dried over sodium sulfate and evaporated. The resulting 3-(1, 2-diphenyl-ethyl)-pyridine is distilled and collected at 162–167°/0.55 mm.; yield: 30 percent.

A mixture of 7.08 g. of 3-(1,2-diphenyl-ethyl)-pyridine and 1.4 g. of a platinum oxide catalyst in 30 ml. of acetic acid is treated with hydrogen at an initial pressure of 3.2 atmospheres and at 40°. After the uptake of hydrogen subsides, the catalyst is filtered off, the filtrate is evaporated, and the residue is distilled to yield the 3-(1,2-diphenyl-ethyl)-piperidine, which is collected at 130–135°/0.07 mm.; yield: 4.6 g.

A mixture of 4.6 g. of 3-(1,2-diphenyl-ethyl)-piperidine, 4.42 g. of N-(2-bromoethyl)-phthalimide and 5.26 g. of sodium carbonate in 60 ml. of toluene containing 1 ml. of water is refluxed for 24 hours, filtered and evaporated to yield 6.0 g. of the oily 3-(1,2-diphenyl-ethyl)-1-[2-(2-phthalimido)-ethyl]-piperidine. The latter is dissolved in 50 ml. of methanol and treated with 10 ml. of hydrazine hydrate (99–100 percent); the reaction mixture is refluxed for twenty hours and worked up as described in Example 26 to yield 3.9 g. of 1-(2-aminoethyl)-3-(1,2-diphenyl-ethyl)-piperidine, which is purified by distillation and collected at 130–160°/0.04 mm.

*Example 28*

A mixture of 2.5 g. of 1-(2-aminoethyl)-3-(2,2'-dimethoxy-benzhydryl)-piperidine and 1.0 g. of S-methyl-isothiourea hydro-chloride in 15 ml. of ethanol is refluxed for three hours and worked up as described before to yield the 3-(2,2'-dimethoxy-benzhydryl)-1-(2-guanidinoethyl)-piperidine hydrochloride of the formula

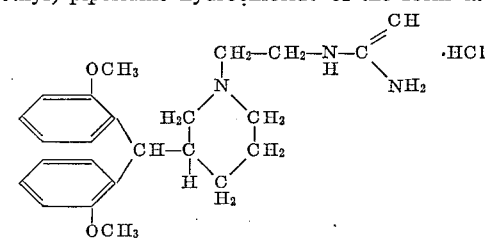

The starting material used in the above procedure is prepared as follows: A solution of 65.4 g. of 2-bromo-anisole in 100 ml. of dry tetrahydrofuran is carefully added to 9.8 g. of magnesium under an atmosphere of dry nitrogen. After refluxing for eight hours, the Grignard reagent is cooled and treated dropwise with a solution of 26.1 g. of ethyl nicotinate in 150 ml. of tetrahydrofuran. The reaction mixture is refluxed for four hours, then cooled in ice, treated with 200 ml. of water and filtered. The filtrate is extracted twice with methylene chloride, the organic extract is dried and evaporated, and the residue is dissolved in ethyl acetate. The organic solution is diluted with hexane, the solid material is filtered off, and the filtrate is evaporated to yield the 3-(2,2' - dimethoxy-α-hydroxy-benzhydryl)-pyridine, which is purified by distillation and collected at 190–195°/0.025 mm.; yield: 29.8 g.

A solution of 29.8 g. of 3-(2,2'-dimethoxy-α-hydroxy-benzhydryl)-pyridine in 250 ml. of acetic acid containing 9.9 g. of a 10 percent palladium-on-charcoal catalyst is treated with hydrogen at a pressure of about 3½ atmospheres and at a temperature of 80°. The catalyst is filtered off, the filtrate is evaporated under reduced pressure and the residue is taken up in water. The aqueous mixture is made basic with a 50 percent aqueous solution of sodium hydroxide; the organic material is extracted with ethyl acetate, the organic extract is dried and treated with a solution of hydrogen chloride in ethyl acetate to yield the 3-(2,2'-dimethoxy-benzhydryl)-piperidine hydrochloride of the formula

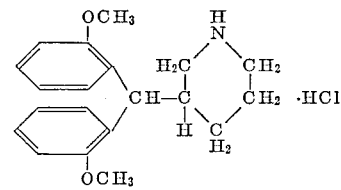

which is recrystallized from isopropanol, M.P. 237–240°; yield: 12.5 g.

A mixture of 11.0 g. of 3-(2,2'-dimethoxy-benzhydryl)-piperidine (obtained from the hydrochloride by treatment with a base), 2.95 g. of chloroacetonitrile and 10.5 g. of sodium carbonate in 50 ml. of toluene containing 1 ml. of water is refluxed for twenty hours while stirring. The hot solution is filtered, the residue is washed with hot benzene, and the combined filtrates are evaporated under reduced pressure. The residual oil yields the 1-cyanomethyl-3-(2,2'-dimethoxy-benzhydryl)-piperidine.

A solution of 4.8 g. of 1-cyanomethyl-3-(2,2'-dimethoxy-benzhydryl)-piperidine in 30 ml. of tetrahydrofuran is added over a period of thirty minutes to a mixture of 1.12 g. of lithium aluminum hydride in 30 ml. of tetrahydrofuran while stirring. After agitating for an additional three hours at room temperature, the reaction mixture is allowed to stand overnight, and is then cooled in an ice-bath and decomposed by adding in the following order 3.4 ml. of ethyl acetate, 1.1 ml. of water, 2.2 ml. of a 15 percent aqueous solution of sodium hydroxide and 3.4 ml. of water. After stirring for thirty minutes, the reaction mixture is filtered, the solid material is washed with tetrahydrofuran, and the combined filtrates are evaporated under reduced pressure to yield the 1-(2-aminoethyl)-3-(2,2'-dimethoxy-benzhydryl)-piperidine of the formula

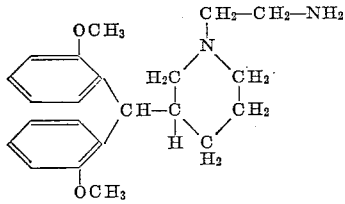

Example 29

A mixture of 5.4 g. of 1-(2-aminoethyl)-3-(4,4'-di-N,N-diethylamino-benzhydryl)-piperidine and 1.9 g. of S-methyl-isothiourea hydrochloride in 30 ml. of a 1:1-mixture of ethanol and water is refluxed for three hours and then allowed to stand overnight at room temperature. The solvent is evaporated under reduced pressure; the residue is taken up in anhydrous ethanol and the solvent is again evaporated to yield the 3-(4,4'-di-N,N-diethylamino-benzhydryl) - 1-(2-guanidinoethyl)-piperidine hydrochloride of the formula

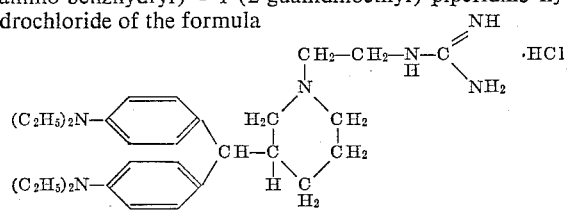

The starting material used in the above procedure is prepared as follows: A solution of 68 ml. of a 15.5 percent solution of butyl lithium in hexane is dissolved in 200 ml. of diethyl ether at —70° and treated over a period of fifteen minutes with 15.8 g. of 3-bromo-pyridine in 100 ml. of diethyl ether. After stirring for thirty minutes at —70°, a solution of 32.4 g. of 4,4'-di-N,N-diethylamino-benzophenone in 1,000 ml. of diethyl ether is added over a period of two hours. The reaction mixture is maintained at —10° to —20° for two hours and is then diluted with 100 ml. of water and 50 ml. of a 25 percent aqueous solution of potassium hydroxide while shaking. The aqueous phase is extracted with methylene chloride; the combined organic solutions are washed with water, dried over magnesium sulfate and evaporated. The residue is dissolved in diethyl ether; the solution is treated with gaseous anhydrous hydrogen chloride to yield a solid material which is recrystallized from a mixture of isopropanol and diethyl ether and dried at low temperature to yield 38.0 g. of the hygroscopic 3-(4,4'-di-N,N-diethylamino-benzhydryl)-pyridine hydrochloride which has the following probable formula

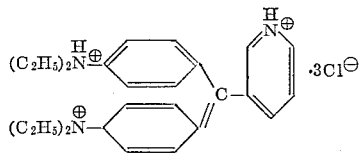

and is obtained in the form of the trihydrate.

A solution of 13.3 g. of the above 3-(4,4'-di-N,N-diethylamino-benzhydryl)-pyridine hydrochloride in 100 ml. of ethanol, containing 0.75 g. of a platinum oxide catalyst and 1 ml. of 5 N ethanolic hydrogen chloride, is treated with hydrogen under a pressure of 3 atmospheres. After completion of the reaction, the catalyst is filtered off, and the filtrate is treated with diethyl ether to yield an oily product, which is triturated with diethyl ether and redissolved in isopropanol. The solution is diluted with diethyl ether to yield the hygroscopic 3-(4,4'-di-N,N-diethylamino-benzhydryl)-piperidine trihydrochloride of the formula

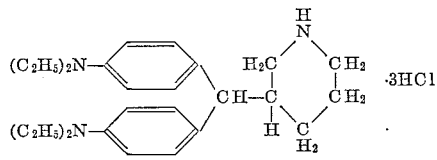

which melts as the monohydrate at 200° (with decomposition) after drying under reduced pressure; yield: 9.5 g.

A mixture of 9.35 g. of 3-(4,4'-di-N,N-diethylamino-benzhydryl)-piperidine, 2.36 g. of chloroacetonitrile and 8.4 g. of sodium carbonate in 30 ml. of toluene, containing 1 ml. of water is refluxed for twenty hours while stirring. The solution is filtered, the residue is washed with benzene, and the combined filtrates are evaporated under reduced pressure to yield the 1-cyanomethyl-3-(4,4'-di-N,N-diethylamino-benzhydryl)-piperidine.

A solution of 4.8 g. of 1-cyanomethyl-3-(4,4'-di-N,N-diethylamino-benzhydryl)-piperidine in 25 ml. of tetrahydrofuran is added over a period of thirty minutes to 0.9 g. of lithium aluminum hydride in 20 ml. of tetrahydrofuran while stirring. After agitating for an additional three hours at room temperature, the reaction mixture is allowed to stand overnight, and is then cooled in an ice-bath and decomposed by adding in the following order 2.7 ml. of ethyl acetate, 0.9 ml. of water, 1.8 ml. of a 15 percent aqueous solution of sodium hydroxide and 2.7 ml. of water. After stirring for thirty minutes, the reaction mixture is filtered, the solid material is washed with tetrahydrofuran, and the combined filtrates are evaporated under reduced pressure to yield the 1-(2-aminoethyl) - 3 - (4,4' - di - N,N - diethylamino - benzhydryl)-piperidine of the formula

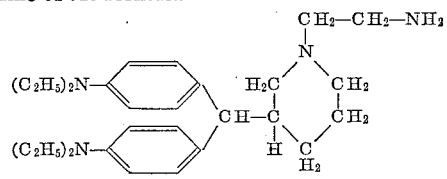

Example 30

A solution of 4.62 g. of 1-(2-aminoethyl)-2-(2,2-diphenylethyl)-piperidine and 1.9 g. of S-methyl-isothiourea hydrochloride in 20 ml. of anhydrous ethanol is refluxed for 4½ hours. The solvent is removed under reduced pressure; the residue is taken up in ethyl methyl ketone and the solution is diluted with diethyl ether. The gummy solid material is redissolved and precipitated as described before, then ground under diethyl ether and dried at 50° under reduced pressure to yield the amorphous hygroscopic 2-(2,2-diphenylethyl)-1-(2-guanidino-ethyl)-piperidine hydrochloride of the formula

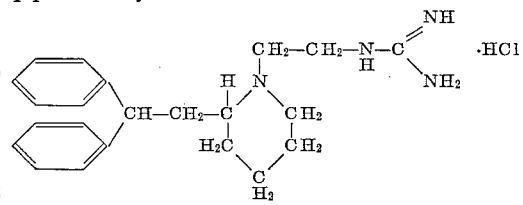

which is obtained as the monohydrate.

The starting material used in the above procedure is prepared as follows: A mixture of 212.0 ml. of a 15.1 percent solution of butyl lithium in 200 ml. of anhydrous diethyl ether is stirred at —65° under an atmosphere of nitrogen while adding a solution of 46.0 g. of 2-picoline in 300 ml. of anhydrous diethyl ether over a period of thirty minutes. After stirring for an additional hour at —65°, the organo-metallic reagent is treated dropwise and over a period of two hours, with a solution of 92.0 g. of benzophenone in 300 ml. of diethyl ether while maintaining the temperature of −65°. The temperature is then allowed to rise to −20° to 0° and maintained for two hours, after which it is allowed to rise to room temperature. The reaction mixture is diluted with 200 ml. of water; the solid material is filtered off, the organic phase of the filtrate is separated and the aqueous solution is extracted with methylene chloride. The combined organic extracts are dried over magnesium sulfate and evaporated; the residue is combined with the above solid material and recrystallized from isopropanol to yield 56.0 g. of 2-(2,2-diphenyl-2-hydroxy-ethyl)-pyridine which melts at 152–154°.

A solution of 5.0 g. of 2-(2,2-diphenyl-2-hydroxy-ethyl)-pyridine in 50 ml. of 48 percent hydrobromic acid is allowed to stand at room temperature for fifteen minutes and is then warmed on the steam bath for one hour. The excess of reagent is evaporated under reduced pressure, and the residue is made basic with aqueous ammonia. The organic material is extracted with methylene chloride, the organic solution is dried and evaporated, and the residue is subjected to a short-path distillation to yield 4.5 g. of 2-(2,2-diphenyl-vinyl)-pyridine, which melts at 118.5–119°.

A solution of 26.0 g. of 2-(2,2-diphenyl-vinyl)-pyridine in 150 ml. of acetic acid containing 8.5 g. of a 10 percent palladium-on-charcoal catalyst is treated with hydrogen at an initial pressure of 3½ atmospheres. The catalyst is then filtered off and the filtrate is concentrated under reduced pressure. The resulting product is dissolved in water, the aqueous solution is made basic with a 50 percent aqueous ammonia solution, and the organic material is extracted with ethyl acetate. The dried organic extract is evaporated and the residue is distilled under reduced pressure to yield the 2-(2,2-diphenylethyl)-piperidine, which is collected at 138–142°/0.3 mm.; yield: 23.0 g.

A suspension of 23.0 g. of 2-(2,2-diphenylethyl)-piperidine in 69 ml. of acetic acid and 3.15 g. of paraformaldehyde is cooled to 10–15° and then treated with a solution of 5.1 g. of sodium cyanide in 15.5 ml. of water while stirring. The reaction mixture is maintained for two hours at 15–20°, for one hour at 30°, and for four hours at 45°, and is then cooled, diluted with water and extracted with two portions of methylene chloride. The organic extract is washed with aqueous ammonia, dried and evaporated to yield 17.4 g. of the viscous 1-cyanomethyl-2-(2,2-diphenyl-ethyl)-piperidine, which is collected at 158–168°/0.025 mm.

A solution of 17.4 g. of 1-cyanomethyl-2-(2,2-diphenyl-ethyl)-piperidine in 50 ml. of tetrahydrofuran is added over thirty minutes to a suspension of 4.5 g. of lithium aluminum hydride in 100 ml. of tetrahydrofuran under an atmosphere of nitrogen. After stirring for six hours at room temperature, the reaction mixture is allowed to stand overnight and is then treated with 13.5 ml. of ethyl acetate, 4.5 ml. of water, 9.0 ml. of a 15 percent aqueous solution of sodium hydroxide and 13.5 ml. of water and filtered. The filtrate is evaporated under reduced pressure and the residue is distilled to yield 13.1 g. of 1-(2-aminoethyl) - 2 - (2,2 - diphenylethyl) - piperidine of the formula

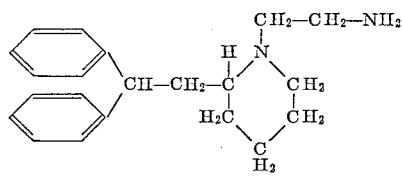

which is collected at 150–162°/0.005 mm. Its dihydrochloride melts at 238° (with decomposition).

*Example 31*

A mixture of 4.62 g. of 1-(2-aminoethyl)-2-(2,2-diphenylethyl)-piperidine and 2.11 g. of N,S-dimethyl-isothiourea hydrochloride in 20 ml. of anhydrous ethanol is reacted as described is Example 30 to yield the amorphous and hydgroscopic 2-(2,2-diphenylethyl)-1-[2-(3-methyl-guanidino)-ethyl]-piperidine hydrochloride of the formula

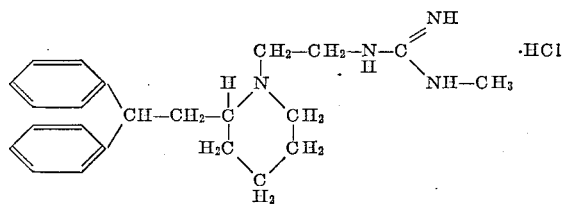

which is obtained as the monohydrate.

*Example 32*

A mixture of 8.0 g. of 1-(2-aminoethyl)-3-di-(4-fluorophenyl)-methyl-piperidine and 3.05 g. of S-methyl-isothiourea hydrochloride in 25 ml. of ethanol is refluxed for four hours and then concentrated under reduced pressure. The residue is dissolved in ethyl methyl ketone and precipitated with diethyl ether; this procedure is repeated twice and the resulting 3-di-(4-fluoro-phenyl)-methyl-1-(2-guanidino-ethyl)-piperidine hydrochloride of the formula

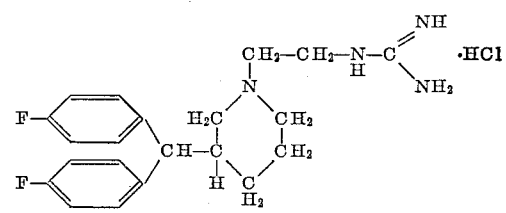

is dried at 60° under reduced pressure for eight hours; it melts as the dihydrate between 90–120°.

The starting material used in the above procedure is prepared as follows: A mixture of 64.2 g. of pyridine 3-carboxaldehyde and 150 ml. of fluorobenzene is added dropwise to a dispersion of 90 ml. of concentrated sulfuric acid in 120 ml. of fluorobenzene. The temperature rises to 60–70° and is held at 85° for twenty hours while stirring. After cooling, the reaction mixture is poured onto ice; the aqueous mixture is neutralized with sodium carbonate and extracted with chloroform. The organic solution is dried over calcium sulfate, concentrated and evaporated to yield the 3-di-(4-fluoro-phenyl)-methyl-pyridine, which is distilled and collected at 160–164°/0.47 mm.; yield: 132.1 g.

A solution of 60.0 g. of 3-di-(4-fluoro-phenyl)-methyl-pyridine in 190 ml. of acetic acid, containing 10.7 g. of platinum oxide is treated with hydrogen at an initial pressure of about 3.2 atmospheres and at 40°. After about two hours, the reaction is interrupted, the catalyst is filtered off and the filtrate is concentrated under reduced pressure. The residue is dissolved in 50 ml. of water; the aqueous solution is made alkaline with a 40 percent aqueous solution of sodium hydroxide and extracted with diethyl ether. The organic extract is washed four times with water until neutral, dried over potassium carbonate and evaporated. The oily residue is distilled to yield 49.4 g. of 3-di-(4-fluoro-phenyl)-methyl-piperidine, which is collected at 164°/0.9 mm., and re-distilled, B.P. 160°/0.5 mm.

A mixture of 40.0 g. of 3-di-(4-fluoro-phenyl)-methyl-piperidine, 35.6 g. of N-(2-bromoethyl)-phthalimide and 42.5 g. of sodium carbonate in 430 ml. of toluene, containing 4 ml. of water, is refluxed for 24 hours. After filtering the solution is concentrated under reduced pressure to yield 80.0 g. of the N-{2-[3-di-(4-fluoro-phenyl)-methyl-1-piperidino]-ethyl}-phthalimide, which is dissolved in 650 ml. of methanol and treated with 124 ml. of hydrazine hydrate (99–100%). After refluxing for twenty hours, the reaction mixture is cooled and made acidic with concentrated hydrochloric acid. Refluxing is then continued for two hours; the hot reaction mixture is filtered and cooled. The precipitate is filtered off; the filtrate is concentrated under reduced pressure and the residue is dissolved in a minimum amount of water. The solution is made alkaline with a 50 percent potassium hydroxide solution, extracted with diethyl ether, saturated with potassium carbonate and again extracted with diethyl ether. The combined organic extracts are dried over potassium carbonate and concentrated to yield the oily 1-(2-aminoethyl) - 3 - di-(4 - fluoro - phenyl) - methyl - piperidine, which is purified by distillation and collected at 152–160°/0.15 mm.; yield: 30 g. Its hydrochloride salt, obtained by treating an ethanol solution of the free base with gaseous hydrogen chloride, and precipitating it with diethyl ether, is obtained as an oily material.

*Example 33*

A mixture of 8.0 g. of 1-(2-aminoethyl)-3-di-(4-fluorophenyl)-methyl-piperidine and 3.41 g. of N,S-dimethyl-isothiourea hydrochloride in 25 ml. of ethanol is refluxed for four hours and then concentrated under reduced pressure. The residue is dissolved in ethyl methyl ketone and precipitated with diethyl ether; after repeating this operation twice, the desired 3-di-(4-fluoro-phenyl)-methyl-1-[2-(3-methyl-guanidino)-ethyl]-piperidine hydrochloride of the formula

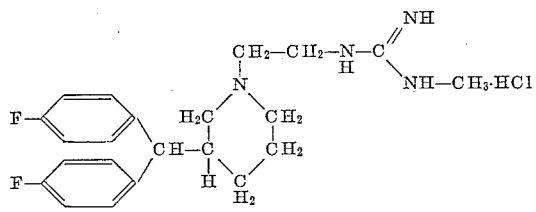

is dried under reduced pressure and melts at 97–103° as the dihydrate.

*Example 34*

A solution of 2.27 g. of 1-(2-aminoethyl)-3-triphenylmethyl-piperidine and 0.87 g. of N,S-dimethyl-isothiourea hydrochloride in 10 ml. of anhydrous ethanol is refluxed for 2¾ hours. On dilution with diethyl ether, a gummy white solid material is obtained, which is triturated with diethyl ether to yield the 1-[2-(3-methyl-guanidino)-ethyl]-3-triphenylmethyl-piperidine hydrochloride of the formula

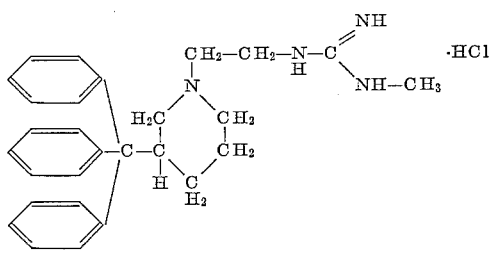

which melts at about 150° after two recrystallizations from a mixture of ethyl methyl ketone and diethyl ether and contains one mole of water.

The starting material used in the above procedure is prepared as follows: A mixture of 6.5 g. of 3-triphenylmethyl-pyridine (Adams et al., J. Am. Chem. Soc., vol. 71, p. 389 (1949)), and 3.0 g. of a 10 percent palladium-on-charcoal catalyst in 100 ml. of acetic acid is treated with hydrogen (initial pressure: 3½ atmospheres) over a period of two days while maintaining a temperature of 70°. The reaction mixture is cooled, the catalyst is filtered off and the filtrate is evaporated under reduced pressure The residue is dissolved in water and the aqueous solution is made basic with a 15 percent solution of sodium hydroxide in water. The basic organic material is extracted with ethyl acetate; the organic solution is dried and evaporated under reduced pressure to yield the desired 3-triphenylmethyl-piperidine, which crystallizes on being triturated with hexane, and is dissolved in ethyl acetate and treated with a concentrated solution of hydrogen chloride in ethyl acetate. The crystalline 3-triphenylmethyl-piperidine hydrochloride melts at 255–257° (yield: 7.0 g.). It is reconverted into the free base by treating a suspension thereof in hot water with an aqueous sodium hydroxide solution, filtering off the product and extracting the free base with diethyl ether, using a soxhlet extraction apparatus.

A mixture of 8.0 g. of 3-triphenylmethyl-piperidine, 6.1 g. of N-(2-bromoethyl)-phthalimide and 6.4 g. of sodium carbonate in 100 ml. of toluene containing 0.5 ml. of water, is vigorously refluxed for 24 hours while stirring. The hot solution is filtered, the residue is washed with hot benzene, and the combined organic solutions are concentrated under reduced pressure to yield the oily N-[2-(3-triphenylmethyl-1-piperidino)-ethyl]-phthalimide, which crystallizes on cooling and is recrystallized from a mixture of benzene and pentane, M.P. 183–186°, yield: 7.0 g.

A solution of 7.0 g. of N-[2-(3-triphenylmethyl-1-piperidino)-ethyl]-phthalimide, and 0.75 g. of hydrazine hydrate (99–100%) in 175 ml. of 95 percent ethanol is refluxed for 48 hours, after which another 0.75 g. of hydrazine hydrate is added, and refluxing is continued for 48 hours. The reaction mixture is partially concentrated to yield a crystalline precipitate which is suspended in water. The suspension is acidified with concentrated hydrochloric acid; the solid material is filtered off, and washed with water. The filtrate and the washings are made basic with a sodium hydroxide solution in water, and the basic organic material is extracted with ethyl acetate. The dried organic extract is treated with a concentrated solution of hydrogen chloride in ethyl acetate and diluted with diethyl ether to yield the hydrochloride salt of 1-(2-aminoethyl)-3 - triphenylmethyl - piperidine, M.P. 189–199°; yield: 3.6 g. An aqueous solution of the salt is treated with ammonium hydroxide, and the resulting 1-(2-aminoethyl)-3-triphenylmethyl-piperidine of the formula

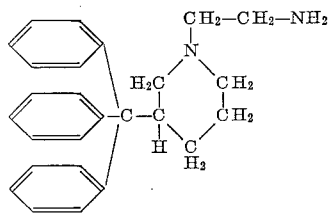

is distilled; it melts at 64.5–66°; yield: 2.3 g.

*Example 35*

A mixture of 5.0 g. of 1-(2-aminoethyl)-3-benzyl-piperidine and 3.1 g. of N,S-dimethyl-isothiourea hydrochloride in 10 ml. of anhydrous ethanol is refluxed for three hours. After standing overnight, the reaction mixture is poured into an excess of diethyl ether, whereupon a gummy solid separates which is dissolved in 5 ml. of ethanol and treated with a concentrated solution of hydrogen chloride in ethyl acetate. The gummy solid is triturated with diethyl ether to yield the amorphous 3-benzyl-1-[2-(3-methylguanidino)-ethyl]-piperidine dihydrochloride of the formula

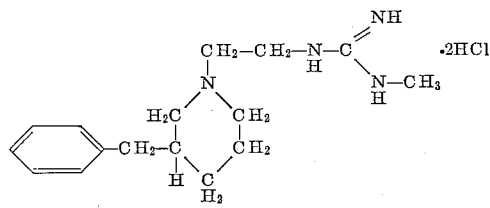

obtained as the hemihydrate, which is strongly hygroscopic, yield: 4.0 g.

The starting material used in the above procedure is prepared as follows: To a solution of 28.0 g. of 3-benzyl-piperidine (Tschitschibabin, Ber., vol. 36, p. 2713 (1903))

and 5.8 g. of paraformaldehyde in 84 ml. of glacial acetic acid is added over a period of ten minutes a solution of 9.4 g. of sodium cyanide in 28 ml. of water while maintaining a temperature of 15–20°. The temperature is then raised to 30° and held for two hours, and for four hours at 40–45°. After standing overnight, the reaction mixture is diluted with water and extracted with benzene. The organic solution is washed with water and dilute ammonium hydroxide, dried and evaporated to yield the 3-benzyl-1-cyanomethyl-piperidine, which is distilled and collected at 130–134°/0.1 mm.; yield: 30.3 g.

A solution of 30.3 g. of 3-benzyl-1-cyanomethyl-piperidine in 200 ml. of tetrahydrofuran is added over a period of two hours to a suspension of 11.1 g. of lithium aluminum hydride in 250 ml. of tetrahydrofuran. After stirring for 25 hours at room temperature, the reaction mixture is cooled and treated with 33.3 ml. of ethyl acetate, 11.1 ml. of water, 22.2 ml. of a 15 percent aqueous solution of sodium hydroxide and 33.3 ml. of water. The resulting mixture is filtered, the solid material is washed with tetrahydrofuran and the filtrate is evaporated under reduced pressure. The residue is distilled to yield the 1-(2-aminoethyl)-3-benzyl-piperidine of the formula

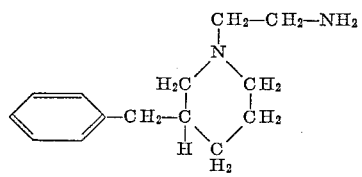

which is collected at 130–140°/0.25 mm. (yield: 26.5 g.); its hydrochloride melts at 190–195°.

*Example 36*

A mixture of 5.0 g. of 1-(2-aminoethyl)-3-benzyl-piperidine and 2.8 g. of S-methyl-isothiourea hydrochloride in 10 ml. of water is reacted as described in Example 35; the resulting 3-benzyl-1-(2 - guanidino - ethyl)-piperidine dihydrochloride of the formula

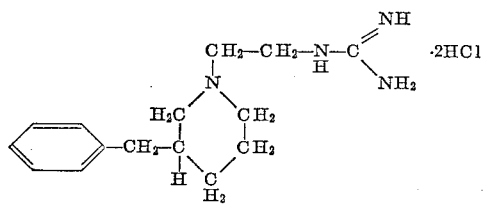

is obtained as the amorphous hemihydrate and is hygroscopic.

*Example 37*

A mixture of 10.5 g. of 1-(2-aminoethyl)-2-benzyl-piperidine and 6.7 g. of S-methyl-isothiourea sulfate in 10 ml. of water is refluxed for three hours. On cooling, a white crystalline material precipitates and is filtered off to yield the 2-benzyl-1-(2-guanidino-ethyl)-piperidine sulfate of the formula

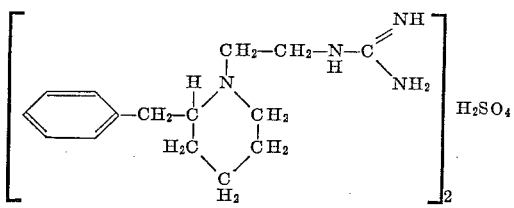

which is recrystallized from isopropanol, triturated with diethyl ether and dried, M.P. 200° (with decomposition); yield: 6.2 g.

The starting material used in the above procedure is prepared as follows: A mixture of 18.8 g. of 2-benzyl-piperidine (Tschitschibabin, J. Russian Phys. Chem. Soc., vol. 34, p. 508 (1902); C. 1902 II, 597), 9.1 g. of chloroacetonitrile and 35.0 g. of anhydrous sodium carbonate in 210 ml. of toluene containing 2 ml. of water is refluxed for twelve hours while stirring. After standing overnight at room temperature, the suspension is reheated and filtered hot; the inorganic material is washed with hot benzene and the combined organic solutions are dried and evaporated. The desired 2-benzyl-1-cyanomethyl-piperidine is purified by distillation and collected at 182–190°/18 mm.; yield: 12.5 g.

A solution of 12.5 g. of 2-benzyl-1-cyanomethyl-piperidine in 100 ml. of diethyl ether is added over a period of one hour to a suspension of 4.4 g. of lithium aluminum hydride in 150 ml. of diethyl ether. After stirring for three hours, the solution is allowed to stand overnight at room temperature and is then treated with 13.2 ml. of ethyl acetate, 4.4 ml. of water, 8.8 ml. of a 15 percent aqueous solution of sodium hydroxide and 13.2 ml. of water. The solid material is filtered off and washed with diethyl ether, and the combined organic solutions are evaporated. The desired 1-(2-aminoethyl)-2-benzyl-piperidine of the formula

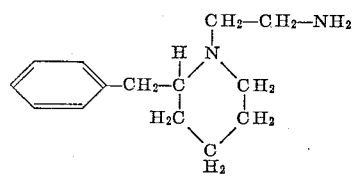

is purified by distillation and collected at 165–200°/16 mm.; yield: 10.5 g.

*Example 38*

The homogenous solution of 15.0 g. of 1-(2-aminoethyl)-3-benzhydryl-piperidine and 6.4 g. of S-methyl-isothiourea hydrochloride in 25 ml. of anhydrous ethanol is refluxed for three hours and allowed to stand at room temperature overnight. The solvent is evaporated under reduced pressure, and the residue is treated with isopropanol. The solvent is again distilled off in order to remove all of the generated methylmercaptan, and the residue is dissolved in isopropanol, treated with a slight excess of ethanolic hydrogen chloride, and filtered. The filtrate is diluted with diethyl ether; a gummy precipitate is formed, which is filtered off, washed with diethyl ether and dried; yield: 17.8 g. of the amorphous hydrochloride salt. The latter is dissolved in 50 ml. of water; the solution is treated with a charcoal preparation, filtered and poured into about 300 ml. of acetone. After chilling, the white crystalline 3-benzhydryl-1-1-(2-guanidino-ethyl)-piperidine dihydrochloride precipitates; it melts at 185–187° as the monohydrate.

*Example 39*

A mixture of 7.6 g. of 1-(2-aminoethyl)-3-benzhydryl-pyrrolidine and 3.45 g. of S-methyl-isothiourea hydrochloride in 15 ml. of anhydrous ethanol is refluxed for four hours. After cooling for two days, the reaction mixture is concentrated under reduced pressure. The residue is taken up in isopropanol and is evaporated to dryness; the procedure is repeated with ethyl methyl ketone. A solution of the residue is ethyl methyl ketone is filtered, and the filtrate is diluted with diethyl ether to yield a gummy precipitate, which solidifies on trituration with diethyl ether. It is again dissolved in ethyl methyl ketone, reprecipitated and triturated with diethyl ether and dried under reduced pressure over phosphorus pentoxide. The resulting 3-benzhydryl-1-(2-guanidino-ethyl)-pyrrolidine hydrochloride of the formula

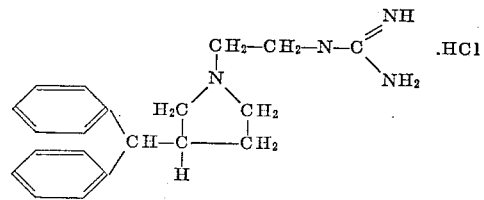

is amorphous; yield: 6.2 g.

The starting material used in the above procedure is prepared as follows: A solution of 260.2 g. of itaconic acid and 214.4 g. of benzylamine is refluxed for two hours, cooled and poured into ice-water while stirring. The solid material is filtered off, and dissolved in 400 ml. of a 5 N aqueous solution of potassium hydroxide; the solution is treated with a charcoal preparation and acidified with concentrated hydrochloric acid. The resulting 1-benzyl-pyrrolidin-2-one 4-carboxylic acid is filtered off, washed with water and dried under reduced pressure over phosphorus pentoxide, M.P. 139–141°; yield: 328 g.

A solution of 108.7 g. of 1-benzyl-pyrrolidin-2-one 4-carboxylic acid in 430 ml. of anhydrous ethanol is treated with 91.6 ml. of concentrated sulfuric acid. The resulting solution is refluxed for three hours and allowed to stand overnight; the excess of ethanol is evaporated under reduced pressure and the residue is poured onto ice. The mixture is neutralized with ammonium hydroxide and the organic material is extracted with methylene chloride. The organic extract is dried and concentrated, and the resulting ethyl 1-benzyl-pyrrolidin-2-one 4-carboxylate is purified by distillation and collected at 234–240°/15 mm.; yield: 102.2 g.

A solution of 110.2 g. of ethyl 1-benzyl-pyrrolidin-2-one 4-carboxylate in 60 ml. of tetrahydrofuran is slowly added to a suspension of 26.8 g. of lithium aluminum hydride in 366 ml. of tetrahydrofuran under an atmosphere of nitrogen; the rate of addition is regulated to maintain refluxing condition. Stirring and refluxing is continued for ten hours, and the reaction mixture is then treated with 80.5 ml. of ethyl acetate, 26.8 ml. of water, 53.6 ml. of a 15 percent aqueous solution of sodium hydroxide, and 80.5 ml. of water. The solid material is filtered off and extracted with ethanol in a soxhlet apparatus. The combined organic solutions are concentrated to dryness and the resulting 1-benzyl-3-hydroxymethyl-pyrrolidine is purified by distillation and collected at 173–175°/14 mm.; yield: 77 g.

A solution of 76.8 g. of 1-benzyl-3-hydroxymethyl-pyrrolidine in 442 ml. of 2 N sulfuric acid is added dropwise while stirring to a solution of 88.5 g. of chromium trioxide in 590 ml. of 2 N sulfuric acid. After standing overnight at room temperature, a barium hydroxide solution is added until the reaction mixture is basic; it is made neutral by adding solid carbon dioxide. The solid material is filtered off and washed with water, and the filtrate is concentrated to dryness. The residue is taken up in isopropanol and evaporated to dryness; this procedure is repeated with ethyl methyl ketone and the solid 1-benzyl-pyrrolidine 3-carboxylic acid is recrystallized from ethyl methyl ketone, M.P. 102–105°; yield: 58 g.

A solution of 47.8 g. of 1-benzyl-pyrrolidine 3-carboxylic acid and 43.0 g. of concentrated sulfuric acid in 392 ml. of anhydrous ethanol is refluxed for three hours while stirring. After standing overnight, the reaction mixture is concentrated under reduced pressure and the residue is poured on ice. The aqueous mixture is neutralized with ammonium hydroxide and extracted with methylene chloride. The organic solution is dried and concentrated to yield the ethyl 1-benzyl-pyrrolidine 3-carboxylate which is purified by distillation and collected at 118–120°/0.75 mm.; yield: 43.9 g.

A solution of 136.0 g. of bromo-benzene in 200 ml. of anhydrous diethyl ether is added to 20.2 g. of magnesium; the preparation of the Grignard reagent is complete after refluxing for one hour. It is cooled and treated dropwise with a solution of 32.6 g. of ethyl 1-benzyl-pyrrolidine 3-carboxylate in 100 ml. of anhydrous diethyl ether. The reaction mixture is refluxed for three hours while stirring, and is then decomposed by carefully adding water. The aqueous layer is separated and extracted with diethyl ether and with methylene chloride. The combined organic solutions are dried and concentrated under reduced pressure. The residue crystallizes on scratching to yield the 1-benzyl-3-(diphenyl-hydroxymethyl)-pyrrolidine, which melts at 98–99° after recrystallization from isopropanol; yield: 36.0 g.

A mixture of 41.5 g. of 1-benzyl-3-(diphenyl-hydroxymethyl-pyrrolidine and 12.0 g. of 10 percent palladium-on-charcoal in 250 ml. of anhydrous ethanol is treated with hydrogen under in initial pressure of three atmospheres and at a temperature of 50°. After the theoretical uptake of hydrogen, the catalyst is filtered off, the filtrate is concentrated under reduced pressure and the residue is sublimated to yield 26.6 g. of 3-(diphenylhydroxymethyl)-pyrrolidine, M.P. 146°.

A solution of 14.9 g. of 3-(diphenyl-hydroxymethyl)-pyrrolidine in 200 ml. of 48% hydrobromic acid is stirred overnight at room temperature. The precipitate is filtered off and recrystallized from isopropanol to yield 11.4 g. of 3-diphenyl-methylene-pyrrolidine hydrobromide, M.P. 263–264°.

A mixture of 11.4 g. of 3-diphenylmethylene-pyrrolidine hydrobromide and 0.5 g. of a platinum oxide catalyst in 150 ml. of anhydrous ethanol is treated with hydrogen under an initial pressure of three atmospheres. After the uptake of the theoretical amount of hydrogen, the catalyst is filtered off, the filtrate evaporated, and the residue is recrystallized from isopropanol to yield 8.9 g. of 3-benzhydryl-pyrrolidine hydrobromide, M.P. 225°.

A total of 16.5 g. of 3-benzhydryl-pyrrolidine hydrobromide is dissolved in 750 ml. of hot water and filtered. The filtrate is made basic with a 50% aqueous solution of sodium hydroxide and extracted three times with diethyl ether. The organic extract is washed with water, dried and evaporated under reduced pressure to yield 11.3 g. of 3-benzhydryl-pyrrolidine.

A mixture of 11.3 g. of 3-benzhydryl-pyrrolidine and 1.67 g. of paraformaldehyde in 37 ml. of acetic acid is cooled to 15–20° and treated over a period of 15 minutes with a solution of 2.7 g. of sodium cyanide in 8.2 ml. of water while stirring. The temperature of the reaction mixture is maintained at 30° for two hours and at 45° for four hours. After standing at room temperature overnight and treated with 2 ml. of a 37 percent aqueous formaldehyde solution, the reaction mixture is warmed to 40° for one hour, and then diluted with two volumes of water. The organic material is extracted three times with benzene; the organic extract is washed with water and with dilute ammonium hydroxide, dried and evaporated under reduced pressure. The resulting 3-benzhydryl-1-cyanomethly-pyrrolidine is purified by distillation and collected at 190–194°/0.025 mm.; yield: 10.0 g.

A solution of 10.0 g. of 3-benzhydryl-1-cyanomethyl-pyrrolidine in 75 ml. of tetrahydrofuran is added slowly to a stirred suspension of 2.9 g. of lithium aluminum hydride in 50 ml. of tetrahydrofuran under an atmosphere of nitrogen. After stirring for two hours and standing overnight, the reaction mixture is decomposed by adding 8.7 ml. of ethyl acetate, 2.9 ml. of water, 5.8 ml. of a 15 percent aqueous solution of potassium hydroxide and 8.7 ml. of water. The solid material is filtered off and washed with tetrahydrofuran; the filtrate is evaporated to yield the 1-(2-aminoethyl)-3-benzhydryl-pyrrolidine of the formula

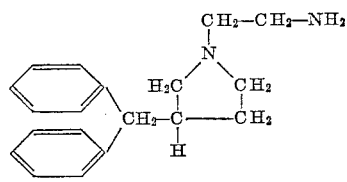

which is purified by distillation and collected at 174–190°/0.01 mm.; yield: 7.6 g.

Example 40

Other compounds of this invention which are prepared according to the above described and illustrated procedure by selecting the appropriate starting materials, are, for example,

| N-(Amino-lower alkyl)-N,N-alkylene-imine Starting Material | Reagent | N-(Guanidino-lower alkyl)-N,N-alkylene-imine Products |
|---|---|---|
| 1-(3-aminopropyl)-2-benzhydryl-piperidine. | S-methyl-isothiourea hydrochloride. | 2-benzhydryl-1-(3-guanidino-propyl)-piperidine hydrochloride. |
| 1-(2-aminoethyl)-2-benzhydryl-piperidine. | N,N',S-trimethyl-isothiourea sulfate. | 2-benzhydryl-1-[2-(2,3-dimethyl-guanidino)-ethyl]-piperidine sulfate. |
| 1-(2-aminoethyl)-2-[α-(4-chloro-phenyl)-benzyl]-piperidine. | S-methyl-isothiourea hydrochloride. | 2-[α-(4-chloro-phenyl)-benzyl]-1-(2-guanidino-ethyl)-piperidine hydrochloride. |
| 1-(2-aminomethyl)-2-(α-cyclohexyl-benzyl)-piperidine. | ____do____ | 2-(α-cyclohexyl-benzyl)-1-(2-guanidino-ethyl)-piperidine hydrochloride. |
| 1-(3-aminopropyl)-2-di-(4-methyl-phenyl)-methyl-piperidine. | ____do____ | 2-di-(4-methyl-phenyl)-methyl-1-(3-guanidino-propyl)-piperidine hydrochloride. |
| 1-(3-aminopropyl)-3-benzhydryl-piperidine. | N,S-dimethyl-isothiourea sulfate. | 3-benzhydryl-1-[3-(3-methyl-guanidino)-propyl]-piperidine sulfate. |
| 1-(2-aminoethyl)-3-benzhydryl-piperdine. | N-ethyl-S-methyl-isothiourea hydrochloride. | 3-benzhydryl-1-[2-(3-ethyl-guanidino)-ethyl]-piperidine hydrochloride. |
| 1-(2-N-methyl-amino-ethyl)-3-benzhydryl-piperidine. | N,N',S-trimethyl-isothiourea hydrochloride. | 3-benzhydryl-1-[2-(1,2,3-trimethyl-guanidino)-ethyl]-piperidine hydrochloride. |
| 1-(2-aminoethyl)-3-benzhydryl-piperidine. | N,N'-diethyl-S-methyl-isothiourea hydrochloride. | 3-benzhydryl-1-[2-(2,3-diethyl-guanidino)-ethyl]-piperidine hydrochloride. |
| 1-(3-N-methyl-aminopropyl)-3-benzhydryl-piperidine. | S-methyl-isothiourea hydrochloride. | 3-benzhydryl-1-[3-(1-methyl-guanidino)-propyl]-piperidine hydrochloride. |
| 1-(2-aminoethyl)-3-di-(3-chloro-phenyl)-methyl-piperidine. | ____do____ | 3-di-(3-chloro-phenyl)-methyl-1-(2-guanidino-ethyl)-piperidine hydrochloride. |
| 1-(2-aminoethyl)-3-di-(4-ethoxy-phenyl)-methyl-piperidine. | ____do____ | 3-di-(4-ethoxy-phenyl)-methyl-1-(2-guanidino-ethyl)-piperidine hydrochloride. |
| 1-(2-aminoethyl)-3-di-(2-methyl-phenyl)-methyl-piperidine. | ____do____ | 1-(2-guanidino-ethyl)-3-di-(2-methyl-phenyl)-methyl-piperidine hydrochloride. |
| 1-(2-aminoethyl)-3-[(2-methyl-phenyl)-(4-methyl-phenyl)-methyl]-piperidine. | ____do____ | 1-(2-guanidino-ethyl)-3-[(2-methyl-phenyl)-(4-methyl-phenyl)-methyl]-piperidine hycrochloride. |
| 1-(2-aminoethyl)-3-[α-(4-trifluoromethyl-phenyl)-benzyl]-piperidine. | ____do____ | 1-(2-guanidino-ethyl)-3-[α-(4-trifluoromethyl-phenyl)-benzyl]-piperidine hydrochloride. |
| 1-(2-aminoethyl)-3-(α-cyclohexyl-benzyl)-piperidine. | N,S-dimethyl-isothiourea hydrochloride. | 3-(α-cyclohexyl-benzyl)-1-[2-(3-methyl-guanidino)-ethyl]-piperidine hydrochloride. |
| 1-(2-aminoethyl)-4-di-(4-methyl-phenyl)-methyl-piperidine. | S-methyl-isothiourea hydrochloride. | 1-(2-guanidino-ethyl)-4-di-(4-methyl-phenyl)-methyl-piperidine hydrochloride. |
| 1-(2-aminoethyl)-3-benzhydryl-6-methyl-piperidine. | ____do____ | 3-benzhydryl-1-(2-guanidino-ethyl)-6-methyl-piperidine hydrochloride. |
| 1-(2-aminoethyl)-3-benzhydryl-piperidine. | N-benzyl-S-methyl-isothiourea hydrochloride. | 3-benzhydryl-1-[2-(3-benzyl-guanidino)-ethyl]-piperidine hydrochloride. |
| 1-(2-aminoethyl)-2-benzhydryl-pyrrolidine. | S-methyl-isothiourea hydrochloride. | 2-benzhydryl-1-(2-guanidino-ethyl)-pyrrolidine hydrochloride. |
| 1-(2-aminoethyl)-2-benzhydryl-2,3,4,5,6,7-hexahydro-azepine. | S-methyl-isothiourea sulfate. | 2-benzhydryl-1-(2-guanidino-ethyl)-2,3,4,5,6,7-hexahydro-azepine sulfate. |
| 1-(3-aminopropyl)-2-benzhydryl-2,3,4,5,6,7-hexahydro-azepine. | N,S-dimethyl-isothiourea hydrochloride. | 2-benzhydryl-1-(3-guanidino-propyl)-2,3,4,5,6,7-hexahydro-azepine hydrochloride. |
| 1-(2-aminoethyl)-2-benzhydryl-1,2,3,4,5,6,7,8-octahydro-azocine. | S-methyl-isothiourea hydrochloride. | 2-benzhydryl-1-(2-guanidino-ethyl)-1,2,3,4,5,6,7,8-octahydro-azocine hydrochloride. |

The starting materials used in the preparation of the above compounds are prepared as previously described and illustrated.

Example 41

A mixture of 6.4 g. of 1-(2-aminoethyl)-3-benzhydryl-piperidine and 4.66 g. of S-methyl-isothiosemicarbazide hydrochloride in 20 ml. of water is refluxed for six hours and is then cooled to yield the desired 3-benzhydryl-1-[2-(3-amino-guanidino)-ethyl]-piperidine hydrochloride of the formula

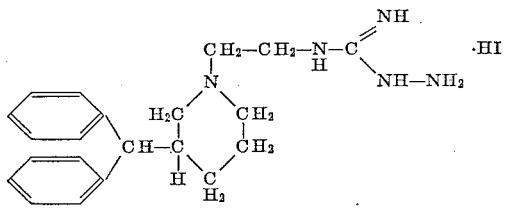

Other compounds of this type, prepared according to the procedure illustrated above by selecting the appropriate starting materials are, for example,

Example 42

Capsules, each containing 0.2 g. of 3-benzhydryl-1-(2-guanidino-ethyl)-piperidine hydrochloride, are prepared as follows (for 10,000 capsules).

Ingredients: G.
3-benzhydryl-1-(2-guanidino-ethyl)-piperidine hydrochloride _____ 2,000.0
Lactose, USP _____ 1,500.0

The lactose is placed in a suitable mixer, the 3-benzhydryl-1-(2-guanidino-ethyl)-piperidine hydrochloride is added and the mixture is agitated until the powders are homogeneously distributed. Portions of 0.350 g. of the resulting mixture are then filled into No. 1 gelatine capsules.

Capsules, each containing 0.15 g. of 3-benzhydryl-1-(2-guanidino-ethyl)-piperidine hydrochloride, are prepared as follows (for 1,000 capsules).

Ingredients: G.
3-benzhydryl-1-(2-guanidino-ethyl)-piperidine hydrochloride _____ 150.0
Magnesium stearate _____ 9.0
Lactose, USP _____ 141.0

The ingredients are blended for twenty minutes in a suitable mixer and passed through a 20 mesh screen. No. 2 capsules are filled with 0.3 g. of the resulting mixture.

| N-(Amino-lower alkyl)-N,N-alkylene-imine Starting Material | S-lower alkylisothiosemicarbazide salt | N-(Guanidino-lower alkyl)-N,N-alkylene-imine Product |
|---|---|---|
| 1-(2-aminoethyl)-3-benzhydryl-pyrrolidine. | S-methyl-isothiosemicarbazide hydrochloride. | 3-benzhydryl-1-[2-(3-amino-guanidino)-ethyl]-piperidine hydrochloride. |
| 1-(2-aminoethyl)-3-di-(3,4-dichloro-phenyl)-methyl-piperidine. | S-methyl-isothiosemicarbazide hydriodide. | 3-di-(3,4-dichloro-phenyl)-methyl-1-[2-(3-amino-guanidino)-ethyl]-piperidine hydriodide. |
| 1-(2-aminoethyl)-3-di-(2,4-dimethoxy-phenyl)-methyl-piperidine. | S-methyl-isothiosemicarbazide hydrochloride. | 3-di-(2,4-dimethoxy-phenyl)-methyl-1-[2-(3-amino-guanidino)-ethyl]-piperidine hydrochloride. |
| 1-(2-aminoethyl)-3-di-(3,4-dimethoxy-phenyl)-methyl-piperidine. | ____do____ | 3-di-(3,4-dimethoxy-phenyl)-methyl-1-[2-(3-amino-guanidino)-ethyl]-piperidine hydrochloride. |
| 1-(2-aminoethyl)-3-di-(4-trifluoromethyl-phenyl)-methyl-piperidine. | ____do____ | 3-di-(4-trifluoromethyl-phenyl)-methyl-1-[2-(3-amino-guanidino)-ethyl]-piperidine hydrochloride. |

What is claimed is:

1. A member selected from the group consisting of a compound of the formula

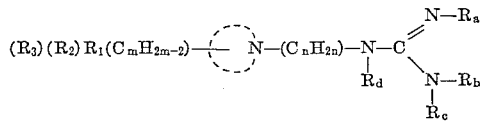

in which the group of the formula —($C_mH_{2m-2}$)— is lower alkylene substituted by $R_1$, $R_2$, $R_3$, one of the groups $R_1$, $R_2$ and $R_3$ being a monocyclic carbocyclic aryl group, and each of the others being a member selected from the group consisting of hydrogen, a monocyclic carbocyclic aryl group and a monocyclic hexacyclic alicyclic group, and in which the group of the formula

is an N,N-alkylene-imino group having from five to eight ring members, and in which one of its ring carbon atoms is substituted by the group of the formula —($C_mH_{2m-2}$)$R_1$($R_2$)($R_3$)

the group of the formula —($C_nH_{2n}$)— is lower alkylene separating the guanidino group from the imino-nitrogen by at least two carbon atoms, and each of the groups $R_a$, $R_c$ and $R_d$ is a member selected from the group consisting of hydrogen and organic radical, and the group $R_b$ is a member selected from the group consisting of hydrogen, lower alkyl, phenyl-lower alkyl, nitroso, nitro, amino and substituted amino, and an acid addition salt thereof.

2. A member selected from the group consisting of a compound of the formula

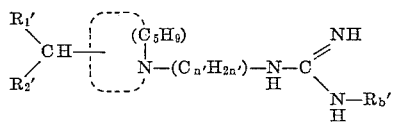

in which each of the groups $R_1'$ and $R_2'$ is a member selected from the group consisting of phenyl, (lower alkyl) - phenyl, (lower alkoxy) - phenyl, (halogeno)-phenyl, (trifluoromethyl) - phenyl and (N,N - di - lower alkyl-amino)-phenyl, the group of the formula —($C_5H_9$) is a 1,5-pentylene radical substituted by the group of the formula

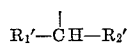

the group of the formula —($C_{n'}H_{2n'}$)— is alkylene having from two to three carbon atoms and separating the guanidino group from the ring-nitrogen by two to three carbon atoms, and the group $R_b'$ is a member selected from the group consisting of hydrogen, lower alkyl and phenyl-lower alkyl, and an acid addition salt thereof.

3. A member selected from the group consisting of a compound of the formula

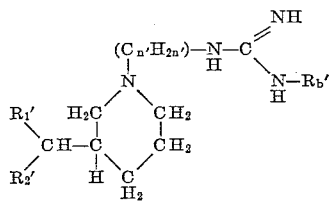

in which each of the groups $R_1'$ and $R_2'$ is a member selected from the group consisting of phenyl, (lower alkyl)-phenyl, (lower alkoxy)-phenyl, (halogeno)-phenyl, (trifluoromethyl)-phenyl and N,N-di-lower alkyl-amino)-phenyl, the group of the formula —($C_{n'}H_{2n'}$)— is alkylene having from two to three carbon atoms and separating the guanidino group from the ring-nitrogen by two to three carbon atoms, and the group $R_b'$ is a member selected from the group consisting of hydrogen, lower alkyl and phenyl-lower alkyl, and an acid addition salt thereof.

4. A member selected from the group consisting of 3-benzhydryl-1-(2-guanidino-ethyl)-piperidine, and an acid addition salt thereof.

5. 3 - benzhydryl - 1 - (2 - guanidino - ethyl) - piperidine sulfate.

6. 3 - benzhydryl - 1 - (2 - guanidino - ethyl) - piperidine hydrochloride.

7. 3 - benzhydryl - 1 - (2 - guanidino - ethyl) - piperidine dihydrochloride.

8. A member selected from the group consisting of (+) - 3 - benzhydryl - 1 - (2 - guanidino - ethyl) - piperidine, and an acid addition salt thereof.

9. A member selected from the group consisting of (—) - 3 - benzhydryl - 1 - (2 - guanidino - ethyl) - piperidine, and an acid addition salt thereof.

10. A member selected from the group consisting of 3-benzhydryl - 1 - [2 - (3 - methyl - guanidino) - ethyl]-piperidine, and an acid addition salt thereof.

11. A member selected from the group consisting of 3-di - (4 - methyl - phenyl) - methyl - 1 - (2 - guanidino-ethyl)-piperidine, and an acid addition salt thereof.

12. A member selected from the group consisting of 3-benzhydryl-1-(2-guanidino-ethyl)pyrrolidine, and an acid addition salt thereof.

13. A member selected from the group consisting of 3-di - (4 - chloro - phenyl) - methyl - 1 - (2 - guanidino-ethyl)-piperidine, and an acid addition salt thereof.

14. A member selected from the group consisting of 3-di - (4 - chloro - phenyl) - methyl - 1 - [2 - (3 - methyl-guanidino)-ethyl]-piperidine, and an acid addition salt thereof.

15. A member selected from the group consisting of 1-(2 -guanidino - ethyl) - 3 - di - (4 - methoxy - phenyl)-methyl-piperidine, and an acid addition salt thereof.

16. A member selected from the group consisting of 3-[α - (4 - fluoro - phenyl) - benzyl] - 1 - (2 - guanidino-ethyl)-piperidine, and an acid addition salt thereof.

17. A member selected from the group consisting of 3-di - (4 - fluoro - phenyl) - methyl - 1 - (2 - guanidino-ethyl)-piperidine, and an acid addition salt thereof.

18. A member selected from the group consisting of 3-di - (4 - fluoro - phenyl) - methyl - 1 - [2 - (3 - methyl-guanidino)-ethyl]-piperidine, and an acid addition salt thereof.

References Cited by the Examiner
UNITED STATES PATENTS

| | | | |
|---|---|---|---|
| 2,075,359 | 3/1930 | Salzberg et al. | 167—22 |
| 2,928,829 | 3/1960 | Mull | 260—313 |
| 3,006,913 | 10/1961 | Mull | 260—313 |
| 3,055,882 | 9/1962 | Mull | 260—313 |
| 3,158,609 | 11/1964 | Hamilton | 260—293 |

WALTER A. MODANCE, *Primary Examiner.*

JOHN D. RANDOLPH, *Examiner.*

AVROM D. SPEVACK, *Assistant Examiner.*